United States Patent
Child et al.

(10) Patent No.: US 9,807,851 B2
(45) Date of Patent: Oct. 31, 2017

(54) IDENTITY-BASED ENVIRONMENT ADJUSTING TECHNIQUES

(71) Applicant: Vivint, Inc., Provo, UT (US)

(72) Inventors: Michael D. Child, Lehi, UT (US); Michelle Zundel, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/047,805

(22) Filed: Feb. 19, 2016

(65) Prior Publication Data

US 2017/0245344 A1    Aug. 24, 2017

(51) Int. Cl.
H05B 37/00    (2006.01)
H05B 37/02    (2006.01)

(52) U.S. Cl.
CPC ..... *H05B 37/0227* (2013.01); *H05B 37/0218* (2013.01); *H05B 37/0236* (2013.01)

(58) Field of Classification Search
CPC .. F24F 11/0012; F24F 11/0034; F24F 11/006; F24F 11/0076; F24F 11/0086; F24F 2011/0013; F24F 2011/0047; F24F 2011/0049; F24F 2011/0058; F24F 2011/0063; F24F 2011/0064; F24F 2011/0068; G06K 9/00288; G06K 9/00302; G06K 9/00335; G06K 9/00758; G06K 9/00771; H02J 15/00
See application file for complete search history.

(56) References Cited

U.S. PATENT DOCUMENTS

| | | | |
|---|---|---|---|
| 8,604,714 B2 | 12/2013 | Mohan et al. | |
| 8,909,380 B2 | 12/2014 | Golding et al. | |
| 9,014,829 B2 | 4/2015 | Chemel et al. | |
| 2012/0101554 A1 | 4/2012 | Feather et al. | |

(Continued)

FOREIGN PATENT DOCUMENTS

WO    2010079388 A1    7/2010

OTHER PUBLICATIONS

Fibaro-motion sensor, Fibaro, Mar. 13, 2014, http://www.fibaro.com/us/the-fibaro-system/motion-sensor (10 pp.).

(Continued)

*Primary Examiner* — Monica C King
(74) *Attorney, Agent, or Firm* — Holland & Hart LLP

(57) ABSTRACT

A method, apparatus, and system for security and/or automation systems, for adjusting a home environment. Some method embodiments involving a lighting system may include receiving data relating to an occupant of a home from a sensor, analyzing the data, identifying the occupant based at least in part on the analyzing, and initiating an adjustment of the lighting system based at least in part on the identifying. One such embodiment may also include searching a catalog of occupant profiles, and comparing the data with the catalog of occupant profiles. Some other method embodiments may initiate adjustments to an environment based on an occupant's preferences (whether those preferences are already included in a profile, or determined by analysis) such as for example the occupant's lighting preferences (in an embodiment involving a lighting system).

(Continued)

One method embodiment may also include correlating data relating to the occupant with the occupant's profile.

20 Claims, 11 Drawing Sheets

(56) References Cited

U.S. PATENT DOCUMENTS

| | | |
|---|---|---|
| 2012/0169249 A1 | 7/2012 | Loveland et al. |
| 2012/0235579 A1 | 9/2012 | Chemel et al. |
| 2015/0048742 A1 | 2/2015 | Wingren |
| 2015/0309487 A1 | 10/2015 | Lyman |
| 2016/0201933 A1* | 7/2016 | Hester .................... F24F 11/006 700/276 |

OTHER PUBLICATIONS

PCT International Search Report for PCT International Application No. PCT/US2017/016643, mailed May 29, 2017 (3 pp.).

* cited by examiner

IDENTITY-BASED ENVIRONMENT ADJUSTING TECHNIQUES

BACKGROUND

The present disclosure, for example, relates to security and/or automation systems, and more particularly to adjusting an elements and/or components relating to an environment.

Security and automation systems are widely deployed to provide various types of communication and functional features such as monitoring, communication, notification, and/or others. These systems may be capable of supporting communication with a user through a communication connection or a system management action.

Current systems fail to provide accurate and customized methods of adjusting a home environment. For example, systems may use motion detectors to turn on lights when motion is detected within a predetermined space and to turn off lights (usually within a set amount of time) after the motion is no longer detected. But these systems fail to provide the specific features customers desire and fail to include customized features for increased functionality. Nevertheless, as described herein, these system may be inaccurate and may not provide the features or the convenience for an occupant or occupants in several respects.

SUMMARY

Methods, apparatuses, techniques, and systems for adjusting a home environment are disclosed. In some embodiments, the method, apparatus, technique, and/or system may include adjusting a home environment based at least in part on an identity of and/or other characteristic relating to at least one occupant. In some embodiments, the identity of an occupant and/or the environment-related factors related to adjustment and/or other operations may be ascertained at least in part by utilizing sensor units or through other inputs. Some embodiments may also involve adjusting the home environment based on certain environmental and/or other conditions of the home, and/or or an occupant's interaction with home features.

According to at least one embodiment, a method for security and/or automation systems is disclosed. In some examples, the method may include receiving data relating to an occupant of a home from a sensor and analyzing the data. The method may include identifying the occupant based at least in part on the analyzing, and (in some embodiments involving a lighting system) initiating an adjustment of the lighting system based at least in part on the identifying. In some examples, identifying the occupant may include matching the occupant to a group of known occupants.

In some examples, analyzing the data may include searching a catalog of occupant profiles and/or comparing the data with the catalog of occupant profiles. In some examples, the adjustment may be initiated based at least in part on one or more occupant profiles. In some examples, the adjustment may be initiated based at least in part on a lighting preference of the occupant. In some examples, identifying the occupant may also include creating a profile for the occupant based at least in part on searching the catalog of occupant profiles.

Other examples may include correlating the data relating to the occupant with the profile of the occupant. In some examples, the data may include a past adjustment of the lighting system by the occupant. The adjustment of the lighting system may be initiated based at least in part on the past adjustment of the lighting system. In other examples, the data may include motion of the occupant. In some of those examples, the adjustment may be initiated based at least in part on a predicted motion of the occupant derived at least in part from the data.

In some examples, the data may include at least one of: a height, or a weight, or a color, or a width, or a body shape, or an article of clothing, or footwear, or a carried item, or glasses, or a facial characteristic, or a mobile device, or a voice, or a gait, or a motion, or a combination thereof. In some examples, the method may include detecting a condition relating to the home, where initiating the adjustment of the lighting system is based at least in part on that condition. In some examples, the condition may include at least one of: an ambient light level, or a time, or a detected object in the home, or a presence of a second occupant, or an activity level of a second occupant, or an ambient noise level, or a combination thereof.

In some examples, the data may include image data. In other examples, initiating the adjustment of the lighting system may be based at least in part on the occupant interacting with a home feature. In some examples, the home feature may include at least one of: an appliance, or a water valve, or an electronic device, or a fireplace, or a door, or a lock, or a cupboard, or a combination thereof. In some examples, the lighting system may include: a first light in a first room and/or a second light in a second room. In such examples, initiating the adjustment may include adjusting the first light and/or the second light.

According to at least one embodiment, an apparatus for security and/or automation and/or lighting systems is described. In some examples, the apparatus may include a processor, memory in electronic communication with the processor, and instructions stored in the memory. In some examples, the instructions may be executable by the processor to receive data relating to an occupant of a home from a sensor, analyze the data, identify the occupant based at least in part on the analyzing, and/or initiate an adjustment of a lighting system based at least in part on the identifying.

In some examples, the instructions may be executable by the processor to analyze the data by searching a catalog of occupant profiles, and comparing the data with the catalog of occupant profiles. In some examples, the adjustment may be initiated based at least in part on the occupant profiles.

Some embodiments relate to a computer-program product for security and/or automation and/or lighting systems. The computer-program product may include a non-transitory computer-readable medium storing computer-executable code, the code executable by a processor to receive data relating to an occupant of a home from a sensor, analyze the data, identify the occupant based at least in part on the analyzing, and/or initiate an adjustment of a lighting system based at least in part on the identifying. In some examples, the code may be further executable by the processor to initiate the adjustment based at least in part on an occupant lighting preference.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Although some current security and automation systems may include some features, the automated functions thereof are limited. Such systems may not involve identifying an occupant and adjusting an environment based on the identity of the occupant. Systems are not customized to determine identity of an occupant and make related adjustments. Furthermore, systems do not simplify and/or customize lighting and/or other environmental features to an occupant or to more than one occupant.

In contrast, at least one embodiment may include receiving data relating to an occupant of a home from a sensor (e.g., a camera), which data may assist in identifying the occupant. Data may include, for example, date related to identifying physical characteristics of the occupant, and/or data relating to the motion of the occupant, among other things. In some examples, the received data may be compared with data relating to a catalog of occupant profiles, to aid in identifying one or more occupant profiles. Based at least in part on one or more identifications, one or more adjustments of an environment (e.g., a lighting system) may be initiated based at least in part on the identifying. For example, in some embodiments, the adjustment may be initiated based at least in part on environment preferences ascertained from the identified occupant's profile and/or other profiles, among other sources.

The following description provides additional examples of a method, apparatus, and system for adjusting a home environment, and in some embodiments, a lighting system. The description is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
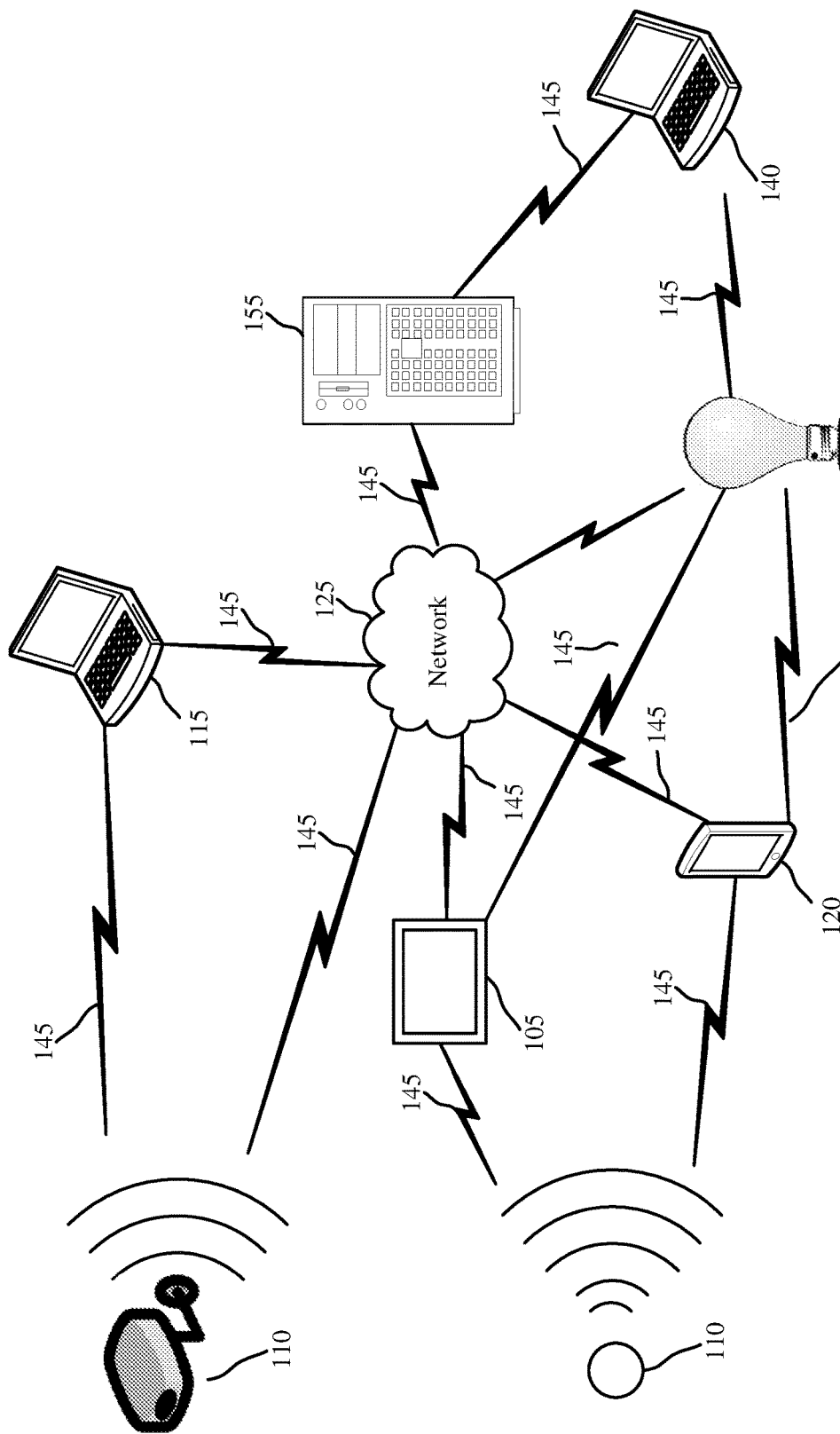
FIG. 1 is a block diagram of an example of a security and/or automation system in accordance with various embodiments.

FIG. 1 is an example of a communications system 100 in accordance with various aspects of the disclosure. In some embodiments, the communications system 100 may include one or more sensor units 110, local computing device 115, 120, network 125, server 155, apparatus 105, and remote computing device 140. One or more sensor units 110 may communicate via wired and/or wireless communication links 145 with one or more of the local computing device 115, 120 and/or network 125. The network 125 may communicate via wired or wireless communication links 145 with the apparatus 105 and the remote computing device 140 via server 155. In alternate embodiments, the network 125 may be integrated with any one of the local computing devices 115, 120, server 155, or remote computing device 140, such that separate components are not required.

Local computing devices 115, 120 and remote computing device 140 may be custom computing entities configured to interact with sensor units 110 via network 125, and in some embodiments, via server 155. In other embodiments, local computing devices 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Apparatus 105 may be a smart home system panel, for example, an interactive panel mounted on a wall in a user's home. Apparatus 105 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125. In some embodiments, the apparatus 105 may be a component of one or all of the local computing devices 115, 120 and/or the remote computing device 140. In some embodiments, the apparatus 105 may process the data received from the one or more sensor units 110 to obtain, identify, determine, analyze, and/or otherwise perform one or more operations related to environmental preferences and/or adjustments to a device 130 and/or an output thereof, such as for example a device 130 in a lighting system. A lighting system may generally to relate to one home and/or one home area, but may in some instances apply to more than one home and/or more than one home area.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The one or more processors of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some embodiments, the one or more sensor units 110 may be sensors configured to conduct periodic or ongoing automatic measurements related to an environment. The sensor units 110 may relate to, but are not limited to: proximity, motion, temperatures, humidity, sound level, smoke, structural features (e.g., glass breaking, window position, door position), time, geo-location data of a user and/or a device, distance, biometrics, weight, speed, direction, gait, height, size, preferences, light, darkness, weather, time, system performance, the status and/or the usage of an electronic device and/or a building feature, and/or other inputs that relate to a security and/or an automation system and/or an occupant of an area and/or a structure, such as a home. Each sensor unit 110 may be capable of sensing one or more environmental parameters, or alternatively, separate sensor units 110 may monitor separate environmental parameters. For example, one sensor unit 110 may measure ambient light level, while another sensor unit 110 (or, in some embodiments, the same sensor unit 110) may detect motion of an occupant. Such detecting motion may in some embodiments occur in relative darkness and/or involve wavelengths within and/or beyond those detectable by the human vision (e.g., near-infrared illumination, microwave radiation, ultrasonic waves, passive infrared radiation, tomographic motion, etc.). One sensor unit 110 embodiment may be a camera. In some embodiments, one or more sensor units 110 may additionally monitor alternate environmental parameters, such as the voice of an occupant. Sensor units 110 may also monitor a variety of electronic devices, such as for example, those pertaining to a home theaters system. In alternate embodiments, a user may input customized environmental preferences directly at the local computing device 115, 120 or at remote computing device 140. For example, a user may enter customized environmental preferences data into a dedicated application on his smart phone indicating preferred light settings.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or a smart phone. Where local computing device 115, 120 is a smart phone, the smart phone may have a dedicated application directed to collecting data regarding occupant-selected settings and calculating preferences therefrom. The local computing device 115, 120 may process the data received from the one or more sensor units 110 to obtain environmental preferences and/or adjustments, such as for example, adjustments to a device 130 or an output thereof. In alternate embodiments, remote computing device 140 may process the data received from the one or more sensor units 110, via network 125 and server 155, to obtain environmental preferences and/or adjustments, such as for example adjustments to a device 130 or an output thereof. Data transmission may occur via, for example, frequencies appropriate for a personal area network (such as BLUETOOTH® or IR communications) or local or wide area network frequencies such as radio frequencies specified by the IEEE 802.15.4 standard, and/or by hard wire connections.

In some embodiments, local computing devices 115, 120 may communicate with remote computing device 140 or apparatus 105 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing devices 115, 120 from remote computing device 140. For example, in some embodiments, remote computing device 140 may include a mobile application that interfaces with one or more functions of local computing devices 115, 120.

The server 155 may be configured to communicate with the sensor units 110, the local computing devices 115, 120, the remote computing device 140 and apparatus 105. The server 155 may perform additional processing on signals received from the sensor units 110 or local computing devices 115, 120, or may simply forward the received information to the remote computing device 140 and apparatus 105.

Server 155 may be a computing device operable to receive data streams (e.g., from sensor units 110 and/or local computing devices 115, 120 or remote computing device 140), store and/or process data, and/or transmit data and/or data summaries (e.g., to remote computing device 140). For example, server 155 may receive a stream (e.g., continuous, intermittent, selectively transmitted) of occupant identification data from a sensor unit 110, a stream of environmental condition data (such as ambient light level) from the same or a different sensor unit 110, and a stream of home feature data from either the same or yet another sensor unit 110. In some embodiments, server 155 may "pull" the data streams, e.g., by querying the sensor units 110, the local computing devices 115, 120, and/or the apparatus 105. In some embodiments, the data streams may be "pushed" from the sensor units 110 and/or the local computing devices 115, 120 to the server 155. For example, the sensor units 110 and/or the local computing devices 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory) containing occupant data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

The device 130 may be a component of a security and automation system for initiating an adjustment of and/or adjusting the environment of a home. In some embodiments the device 130 may be a component of and/or related to a lighting system. The device 130 may communicate with, among other things, the apparatus 105, the network 125, a remote computing device 140 and/or local computing devices 115, 120. In some embodiments of the described method, the apparatus 105 may receive data the sensor units 110, and analyze the data. Based on that data and/or the results of the analysis, an adjustment may be initiated to an environment, through signals sent from the apparatus 105 to the device 130, as one example.

Figure 2:
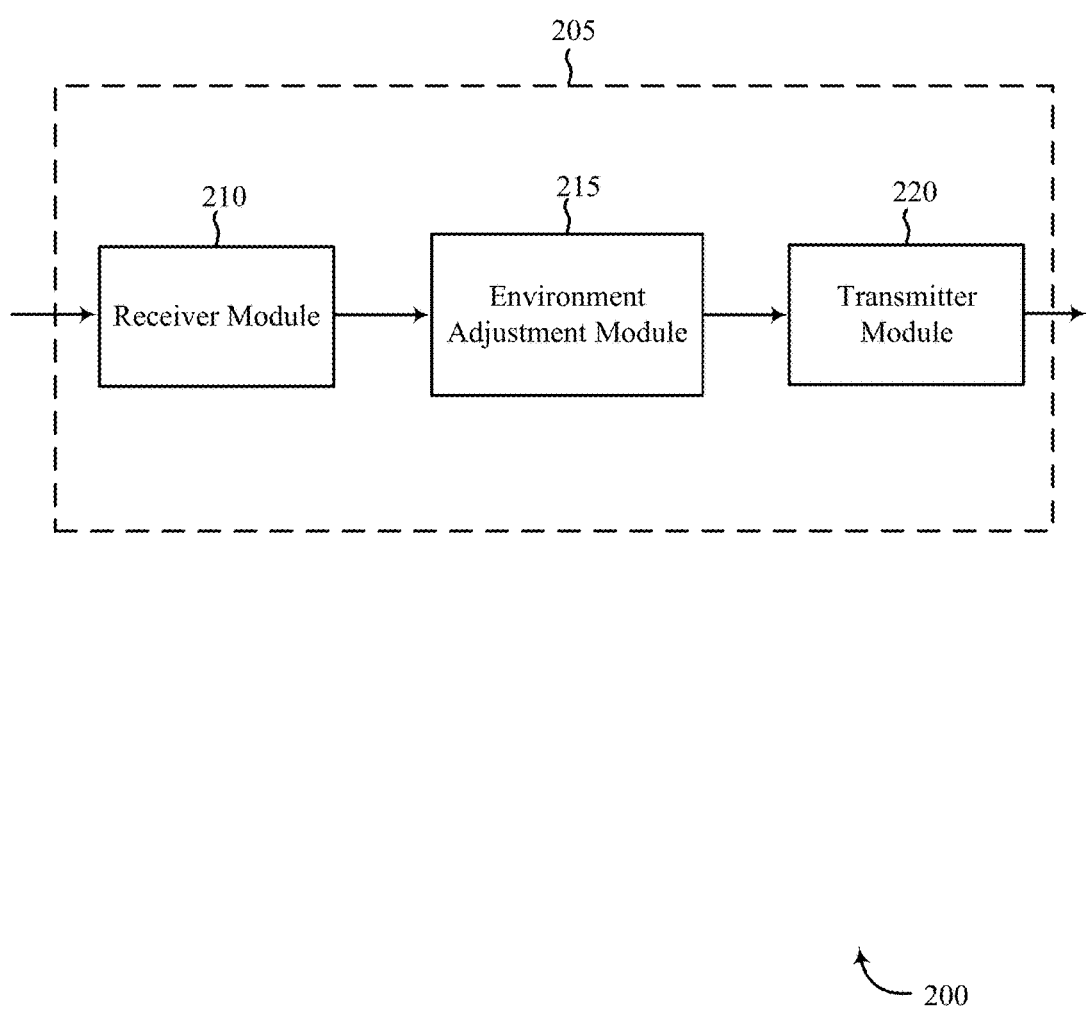
FIG. 2 shows a block diagram of an apparatus relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of an apparatus 105 described with reference to FIG. 1. The apparatus 205 may include a receiver module 210, an environment adjustment module 215, and/or a transmitter module 220. The apparatus 205 may also be or include a processor. Each of these modules may be in communication with each other—directly and/or indirectly. The apparatus 205 may include a control panel, among other things.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive data from sensor units 110, a device 130, one or more components of communication system 100, as well as data relating to an occupant such as a profile, one or more characteristics, identifying information and/or lighting preferences, and/or data relating to home conditions and/or building features, some combination, and/or other data and/or information. Information may be passed on to the environment adjustment module 215, and to other components of the apparatus 205.

The environment adjustment module 215 may analyze data relating to an occupant and/or other data, and perform operations relating to adjusting an environment. In some embodiments, the environment adjustment module 215 may perform operations related to identifying an occupant, and initiating an adjustment, adjustments, or a stream of adjustments of an environment based at least in part on the identifying. Adjustments to various environments are contemplated. For example, in embodiments involving a lighting system, adjustments may be to the lighting system and any component(s) thereof. Other adjustments may include, for example, adjustments to a television or system of televisions, a music system, relatedly a home theater system, a thermostat system, a humidifier system, and/or a water system, among others.

For example, an occupant may be identified in a particular room and an adjustment may be initiated to a television, turning the television on and to a preferred channel by the occupant and/or may be set at a preferred volume. The preferred channel may also be determined based in part on a time of day and/or a listing of programming relating to an identity and/or past viewing history. As the occupant moves from one room to another, the television in one (unoccupied) room may turn off and the television in another (occupied) room may turn on in accordance with the preferred settings. In some embodiments, adjustments may be based at least in part on the position(s) or behavior of the occupant in a room and/or duration of time of the occupant in a room. For example, in some embodiments if the occupant faces toward the television, the television may turn on, or alternatively query using one or more sources (e.g., video, audio, alert on one or more electronic devices) the occupant whether he/she would like the television to turn on.

Scenarios that are similar in at least some aspects are contemplated for preferred settings involving temperature, humidity, and/or water settings, among others. For example, a temperature may be adjusted via a thermostat based on the identity of the occupant of a room, and as the occupant moves from room to room, and/or as the occupant of a room changes, the temperature may adjust accordingly. The temperature may also be adjusted based on received data regarding the clothing on an occupant. For example, an occupant wearing less clothing may lead to upwardly adjusting a temperature setting. Additional operations of the environment adjustment module 215 may become more apparent from additional discussion in the present disclosure relating to additional figures and embodiments. The environment adjustment module 215 may be in communication with the receiver module 210 and the transmitter module 220.

The transmitter module 220 may transmit the one or more signals received from other components of the apparatus 205. The transmitter module 220 may transmit data relating to, for example, adjusting a home environment, including data relating to adjusting a device 130, including in some examples data relating to adjusting a component of a lighting system. In some examples, the transmitter module 220 may be collocated with the receiver module 210 in a transceiver module.

Figure 3:
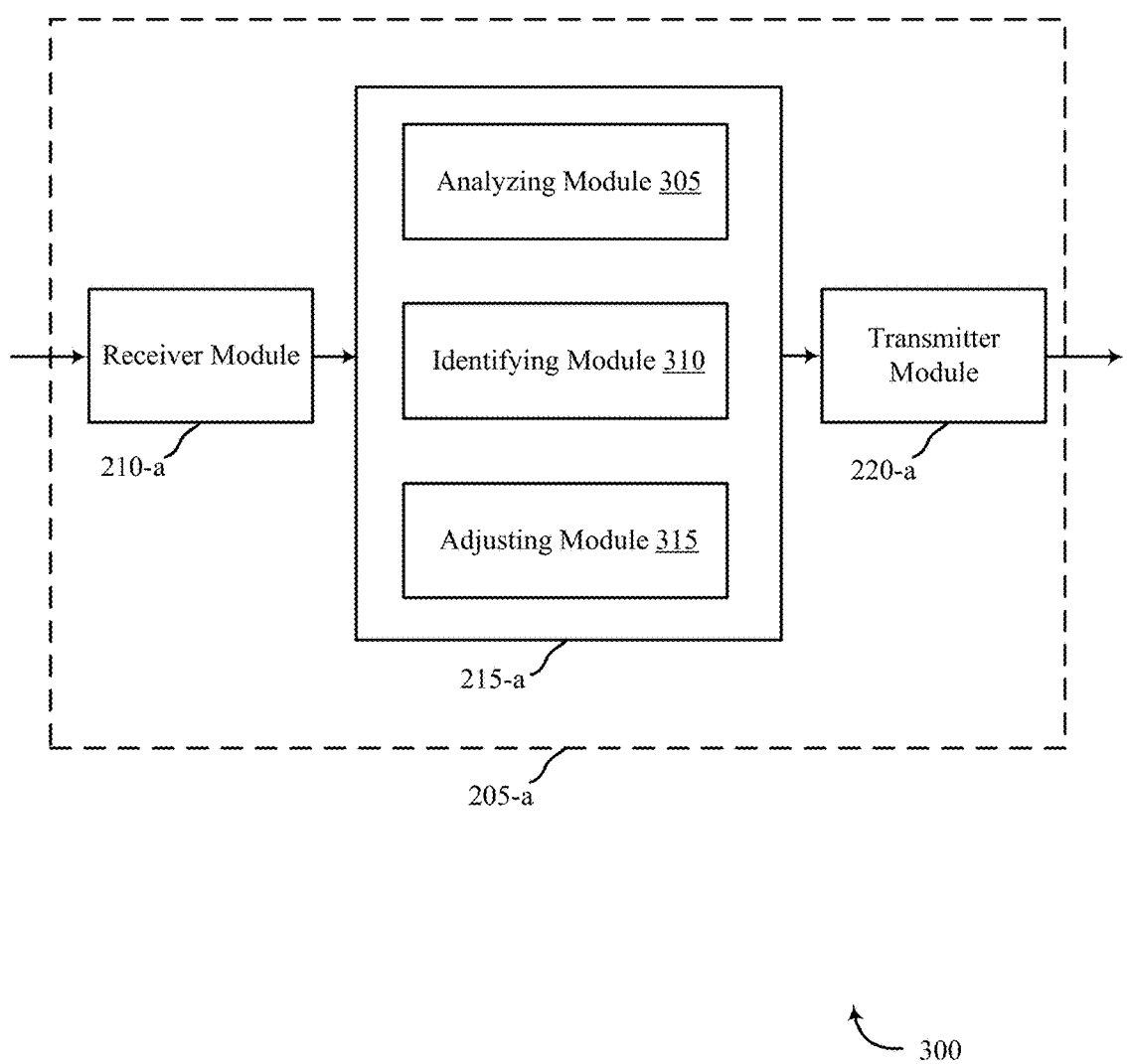
FIG. 3 shows a block diagram of an apparatus relating to a security and/or an automation system, in accordance with various aspects of this disclosure.

FIG. 3 shows a block diagram 300 of an apparatus 205-*a* for use in wireless communication, in accordance with various examples. The apparatus 205-*a* may be an example of one or more aspects of the apparatus 105 described with reference to FIG. 1. It may also be an example of an apparatus 205 described with reference to FIG. 2. The apparatus 205-*a* may include a receiver module 210-*a*, an environment adjustment module 215-*a*, and/or a transmitter module 220-*a* (among others), which may be examples of the corresponding modules of apparatus 205. The apparatus 205-*a* may also include a processor. Each of these components may be in communication with each other. The environment adjustment module 215-*a* may include an analyzing module 305, an identifying module 310, and/or an adjusting module 315, among others.

In some embodiments, the environment adjustment module 215-*a* may include one or more modules (e.g., the analyzing module 305, identifying module 310, and/or adjusting module 315) that may each—individually and/or collectively—may be capable of performing some related and even overlapping operations. For example, the analyzing module 305 may perform operations relating to analyzing the data. Some of the data may relate to determining information about an occupant of a structure, and some may relate to identifying the occupant. On the other hand, some data may not specifically relate to identifying the occupant or to the occupant at all. For example, some data may related to environment conditions and/or other information. Similarly, some data may be received from a sensor, but other data may not be received from a sensor. For example, some data may be received from a database or from some data-transmitting signal (e.g. an emergency weather condition alert).

The identifying module 310 may perform operations relating to identifying the occupant based at least in part on the operations performed by the analyzing module 305. Similarly, the adjusting module 315 may perform operations related to initiating an adjustment of an environment based at least in part on the operations performed by the identifying module 310. The receiver module 210-*a* and the transmitter module 220-*a* may perform the functions of the receiver module 210 and the transmitter module 220, of FIG. 2, respectively.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 4:
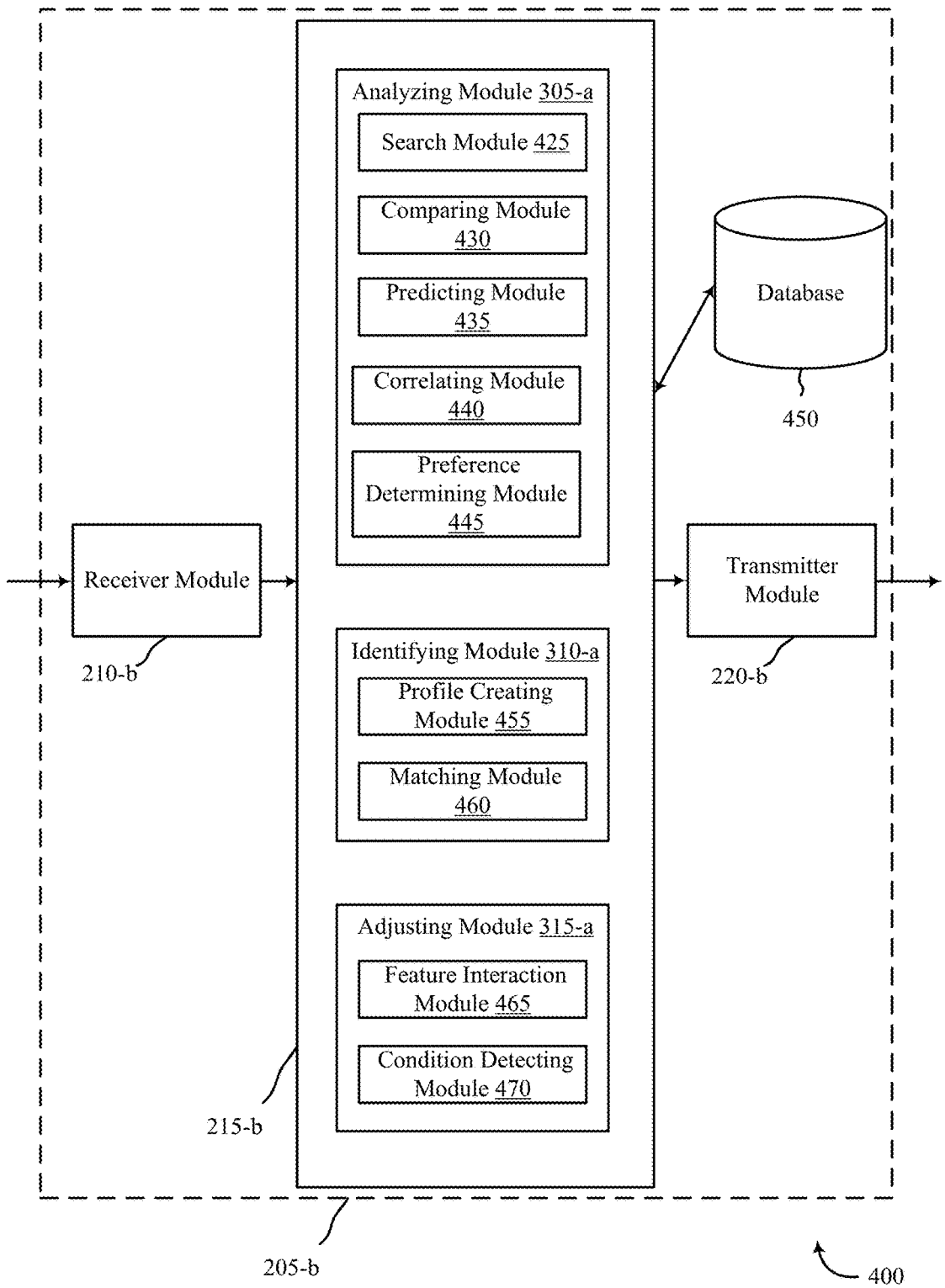
FIG. 4 shows a block diagram of an apparatus relating to a security and/or an automation system, in accordance with various aspects of this disclosure.

FIG. 4 shows a block diagram 400 of an apparatus 205-*b* for use in wireless communication, in accordance with various examples. The apparatus 205-*b* may be an example of one or more aspects of an apparatus 105 described with reference to FIG. 1, among others. It may also be an example of an apparatus 205 described with reference to FIG. 2. It may also be an example of an apparatus 205-*a* described with reference to FIG. 3. The apparatus 205-*b* may include a receiver module 210-*b*, an environment adjustment module 215-*b*, and/or a transmitter module 220-*b*.

The environment adjustment module 215-*b* may include an analyzing module 305-*a*, an identifying module 310-*a*, and/or an adjusting module 315-*a* (which may be examples of one or more aspects of the analyzing module 305, identifying module 310, and adjusting module 315 described with reference to FIG. 3), among others. The analyzing module 305-*a* (as well as the environment adjustment module 215-*a* generally and/or any component modules thereof) may also record, log, and/or store data received form the receiver module 210-*b* in a database 450. The database 450 may also include data and/or information received from sources other than the receiver module 210-*b*. The database 450 may be located either locally or remotely. The analyzing module 305-*a* may analyze data received from the database 425 as well as data received from the receiver module 210-*b*. This analysis may include searching, comparing, weighing, evaluating, ranking, ordering, predicting, determining, organizing, and/or correlating (among other operations) data of one or more different types, including data relating to an environment, a home, a structure, a room, one or more occupants, one or more devices, behavior, user preference, user behavior, home features, environment conditions (including light levels and/or settings, humidity, temperatures, etc.), weather conditions, and/or other data. The analyzing module 305-*a* may include various modules related to analyzing data, including data relating to an occupant. For example, the analyzing module 305-*a* may include, but is not limited to, a search module 425, a comparing module 430, a predicting module 435, a correlating module 440, and/or a preference determining module 445, among others.

The search module 425 may, among other things, perform operations relating to searching a catalog of occupant profiles. In some embodiments, the search module 425 may search a catalog of known occupant profiles and analyze whether one or more of the known occupant profiles includes data that correlates with the received data. In some embodiments—for example where the catalog of occupant profiles is in the database 450—the search module 425 may be in communication with, or have access to, the database 450. By way of example, in one embodiment, received data may indicate that an occupant moves in a particular way. The search module 425 may then search for occupant profiles within the database 450 (e.g., query the database 450) for data indicating or suggesting similar and/or different movement to aid in determining and/or identifying an identity, among other operations.

In addition, the search module 425 may search for data other than the received data, and data that is distinct from a particular occupant profile. For example, in some embodiments, the database 450 may store data related to a variety of things—not just that related to an occupant or to identifying the occupant. For example other data may relate to an environment, a home, a structure, a room, one or more devices, home features, environment conditions such as light levels and/or settings, humidity, temperatures, weather, etc. In some embodiments, some or all of these data types may additionally or alternatively be related to an occupant or to identifying the occupant. In these embodiments, the search module 425 may also search the database 450 for any data in the database 450, not just data associated with an occupant profile.

The comparing module 430 may perform operations relating to, among other things, comparing the data with the catalog of occupant profiles. In some cases, some overlap may exist between the operations performed by the search module 425 and the comparing module 430, or these modules and/or others may work in conjunction. In the example above involving received data indicating that an occupant may move in a particular way, the comparing module 430 may compare received data with similar data of one or more occupant profiles, in order to identify an occupant profile that correlates most accurately (and/or within a certain threshold level of confidence) with the occupant to which the received data relates. The comparing module 430 may also consider more than one type of received data relating to an occupant. For example, where the data relating to the movement of the occupant is similar to movement indicated by one or more occupant profiles, the comparing module 430 may also consider, compare, weigh, and/or evaluate another type of data and/or data point (e.g., the height, or weight, or body features of the occupant), to confirm a match with a greater degree of confidence, or to distinguish between multiple occupant profiles having commonalities with regard to particular type of data. The comparing module 430 may not only compare received data with the data in one or more occupant profiles, but may also compare data of one occupant profile with data of another occupant profile. In addition, the comparing module 430 may compare data that does not relate to an occupant, or that was not necessarily received by a sensor, with other data (and not necessarily data of an occupant profile). Like the search module 425, the comparing module 430 (and any other module mentioned herein) in some embodiments may also be in communication with the database 450. Moreover, in those embodiments, the complexity of the operations performed by the comparing module 430 may vary according to the size and complexity of the database 450 and/or received data.

The correlating module 440 may perform operations relating to, among other things, correlating data relating to the occupant with the profile of the occupant. For example, as mentioned above, data may be received relating to an occupant and stored in the database 450. The database 450 may also include, in some embodiments, a catalog of occupant profiles. Thus, the correlating module 440 may in some embodiments organize the received data so that it may be associated with and/or related to a particular occupant and/or occupant profile based on one or more correlated relationships and/or characteristics. For example, selected environment preferences, routes, and other behavior of an occupant may be stored and also organized in useful ways, such as being correlated with the profile of the occupant. In addition, in some embodiments, the correlating module 440 may also correlate data with groups of occupants. For example, if certain environment preferences are selected when a group of occupants are together, those selected preferences may be correlated with that group of occupants (and/or a similar group of occupants). By way of specific example, when occupants A, B, C, and D are together in a room or in a structure, and a temperature of 70 degrees is selected (or remains unchanged), or certain lights are turned on and/or set to specific brightness levels, those selected environment preferences may be correlated accordingly. In addition, in some embodiments, the correlating module 440 may also correlate data unrelated (or at least not primarily related) to an occupant profile. For example, the correlating module 440 may correlate an ambient light level with a corresponding light setting. The correlating module 440 (and/or any of the other modules discussed herein) may also utilize artificial intelligence.

The predicting module 435 may perform operations relating to, among other things, predicting the behavior of an occupant. For example, where data relates to the motion of an occupant, including motion data stored over time in the database 450, the predicting module 435 may predict the future motion of the occupant based on that stored data. Such data may include, for example, predicting a particular route an occupant may take inside or outside a home, the time that an occupant may begin to take a route and/or return from a route, the walking speed of the occupant, the lights that an occupant may turn on (e.g., while taking a particular route through a home), the home features with which an occupant may interact, the clothing that an occupant might be wearing and/or the articles that an occupant might carry, etc. For example, walking speed may be predicted based on the current walking speed of an occupant, among other things. Furthermore, some predicting may be based on historical data of occupant behavior. In addition, some predicting may be based both on current behavior and historical behavior based on stored data (e.g., historical data relating to the motion of an occupant, the gait of an occupant, and other occupant actions and/or decisions).

For example, if the walking speed of an occupant based on historical data is 3 miles per hour, but the actual current speed of an occupant moving through a building is closer to 8 miles per hour, the predicting module 435 may adjust its predictions accordingly to account for the higher current speed. In another example, where an occupant historically carries a set of keys, a laptop, a briefcase, etc., or is wearing a particular type of article of clothing at a certain time of day on certain days of the week, the predicting module 435 may predict that the occupant will carry the same or similar items and/or articles of clothing on the usual days at the usual times. In addition, in certain examples, based on these operations performed by the predicting module 435, the adjusting module 315-*a* (discussed in more depth below) may make the occupant aware of a potential irregularity in behavior. For example, where the occupant might be leaving to work without a tie on, or where the occupant might be forgetting a laptop, or a briefcase, or a set of keys, a reminder to occupant may be sent whether audibly, visibly (e.g., flashing lights pointing to the potentially forgotten item), or by sending a message to the occupant's cell phone.

The predicting module 435 may also predict the behavior of groups of two or more occupants together. For example, where two or more occupants customarily seat themselves in a particular room and turn on a television to a particular channel on a certain night and/or at a certain time, or turn a fireplace on and to a certain setting, etc., the predicting module may predict such that behavior may continue based on the frequency, rigidity of past settings, detecting current behavior, and/or other information, and adjustments may be made accordingly.

The preference determining module 445 may perform operations relating to determining the environment preferences of a particular occupant, groups of particular occupants, and/or certain categories or types of occupants. In some instances there may be some overlap between the operations performed by the predicting module 435 and by the preference determining module 445. In some embodiments where past adjustments to an environment by a particular occupant are known, the preference determining module 445 may determine environment preferences of an occupant based on the occupant's past adjustments.

For example, where an occupant sets the lights to a particular brightness, or turns certain lights on in a structure at certain times, the preference determining module 445 may also determine that such selections are preferred by the occupant. In another example, where an occupants sets or maintains the temperature of a room at a particular value, the preference determining module 445 may determine that the selected or unchanged value is the preference of the occupant. The preference determining module 445 may also base preferences on a variety of factors and need not be one dimensional. For example, in one embodiment, the preference determining module 445 may presume that the preferred temperature of an occupant is based at least in part on the occupant's level or layering of clothing. Thus, sensors may determine a level of clothing of an occupant and adjust temperature preference accordingly. In that example, based on the determined preferences, the temperature may be different when an occupant is wearing a coat, and when the occupant is lightly clothed or not clothed at all. Relatedly, temperature preferences may be different in different rooms and at different times—for example, in a bathroom when an occupant is showering and/or exits the shower versus a fully-clothed occupant in an entryway of a home (having just entered from the outside) etc. Moreover, in some embodiments, the environment preferences determined by the preference determining module 445 may be correlated the profile of the occupant (for example, by, but not necessarily only by the correlating module 440).

The preference determining module 445 may also determine preferences for particular groups of occupants. For example, based on historical data of environment preferences selected by groups of occupants, the preference determining module 445 may determine that when occupants A, B, C, and D are together, certain environment settings may be preferred. In some instances, these group preferences may be different than each individual occupant's particular preferences alone. Alternatively, the preference determining module 445 may determine that one particular occupant's preference governs over other the preferences of other occupants. This determination may be based, for example, on historical selections of environment settings when the group of occupants are together in a structure, or may also be based on inputted data. Thus, relatedly, the preference determining module 445 may determine environment preferences based on inputted (and not necessarily historical) data. For example, in one embodiment, an administrator may input settings for individual occupants (e.g., preferred environment settings of each occupant), as well as for groups of occupants, which may include whether a particular occupant's preferred settings govern or are given priority over any other occupant's preferred settings. Such preferred settings may be inputted, in one embodiment, during installation and/or at any point thereafter.

In addition, the preference determining module 445 may determine environment preferences that are not specific to one or more occupant. For example, in some embodiments, the preference determining module 445 may determine environment preferences specific to an environment, a home and/or to certain features thereof, etc., and such determining may also be based on among other things historical data. For example, if every occupant selects (or the majority of occupants select) a particular environment setting in a home, the predicting module may ascribe that preference to any occupant regardless of profile (and regardless of whether an occupant profile even is utilized).

The identifying module 310-a may also include various modules related to identifying an occupant. For example, the identifying module 310-a may include a profile creating module 455, and a matching module 460, among others. In some embodiments, the identifying module 310-a may also include and/or be in communication with one or more other modules, including, but not limited to those relating to analyzing module 305-a and/or adjusting module 315-a, among others. In examples involving a catalog of occupant profiles, where one or more occupant profiles correlates with and/or otherwise relates to an occupant (at least within a threshold degree of certainty) for which no profile exists, then the profile creating module 455 may perform operations relating to creating a profile for the occupant, and identifying the occupant and related data using the newly created profile. The matching module 460 may, based at least in part on the analyzed data, match an occupant to a group of known occupants, or to a certain category of occupants (e.g., administrator, follower, child, parent, adult), among other things. In some examples, the matching module 460 may match one or more occupants with a group of occupants having certain environment preferences and ascribe to the one or more occupants some or all of those preferences.

The adjusting module 315-a may also include various modules related to adjusting an environment or environments. For example, the adjusting module 315-a may include, but is not limited to, a feature interaction module 465, and/or a condition detecting module 470. Environment adjustments may include but not be limited to adjustment settings and/or components of a lighting system, a thermostat system, a humidifier system, a water system, a home theater system, etc. The feature interaction module 465 may among other things, determine whether an occupant is interacting with a home feature and initiate an adjustment accordingly. For example, in one embodiment where an occupant is changing a pipe within a cabinet or under a sink, or inserting a key in an outdoor lock at nighttime, a light may be turned on illuminating the particular feature with which the occupant is interacting. In other examples, the feature interaction module 465 may determine that an electronic device is being used (or electronic devices are being used and/or system of electronic devices is being used) by an occupant, and adjustments may be initiated accordingly.

For example, in one instance, the feature interaction module 465 may determine or detect that the use of certain electronic devices indicates that a movie is about to begin in a home theatre room, and adjustments to the lighting system may be initiated to dim the lights to a desirable level. The condition detecting module 470 may detect various conditions relating to environment or to a home such as, for example but not limited to ambient light level, weather patterns, temperature, time, detected objects in the home, presence of more than one occupant, activity level of occupant(s), ambient noise level, water temperature, humidity level, etc.

Adjustments to an environment or environments may be initiated and changed based on the operations performed by the analyzing module 305-a (and any module included therein), as well as based on modules discussed herein included by the adjusting module 315-a. The operations of the feature interaction module 465 and the condition detecting module 470 may also become more apparent in the examples included in the present disclosure. In addition, as mentioned above, in different embodiments, some overlap may exist between the operations performed by the diverse modules that the environment adjustment module may or may not include.

Figure 5:
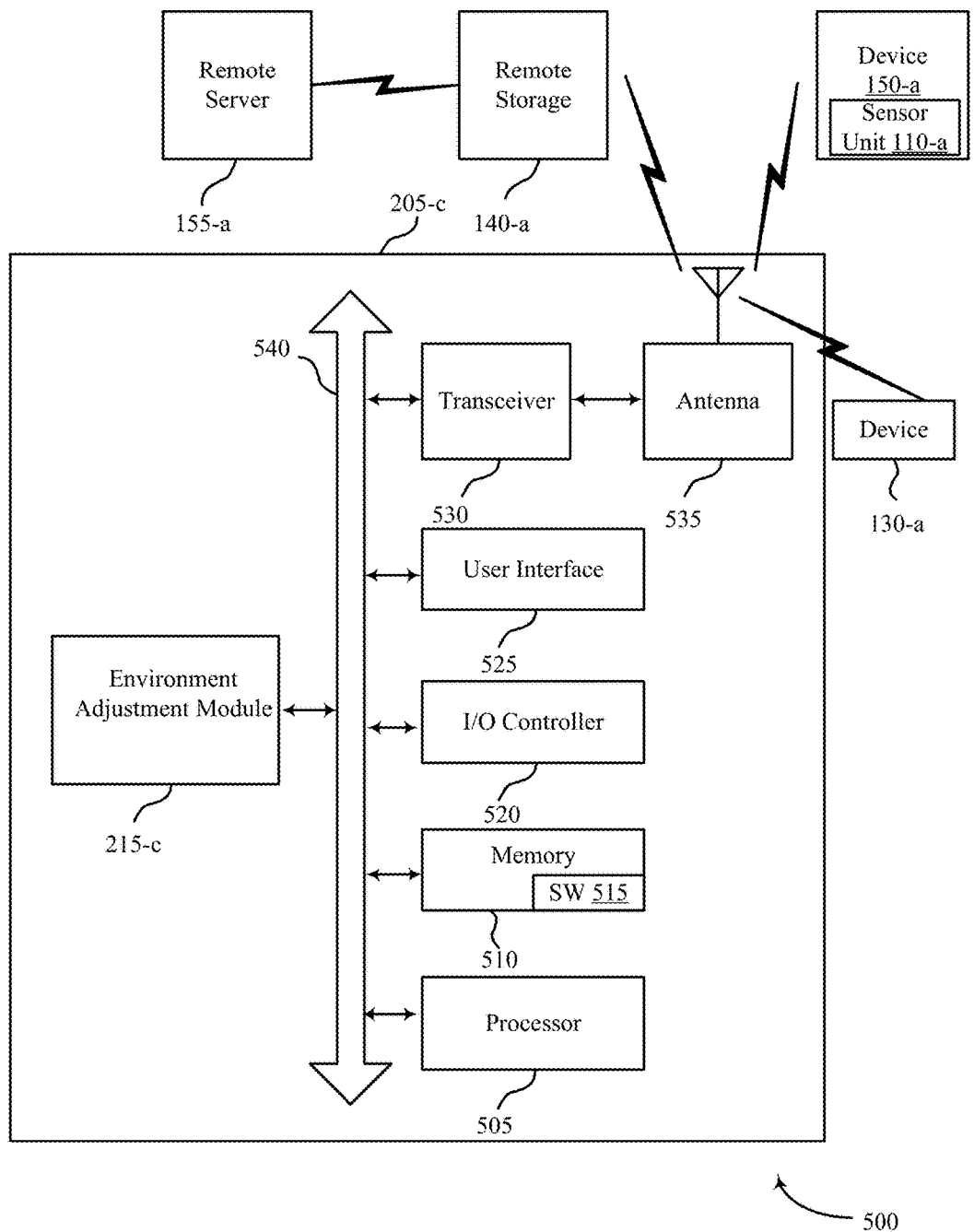
FIG. 5 shows a block diagram of a system relating to a security and/or an automation system, in accordance with various aspects of this disclosure.

FIG. 5 shows a system 500 embodiment for use in security and/or automation systems, in accordance with various examples. System 500 may include an apparatus 205-c, which may be an example of the apparatus 105 of FIG. 1. Apparatus 205-c may also be an example of one or more aspects of apparatuses 205, and/or 205-a, and/or 205-b of FIGS. 2, 3, and 4, respectively.

Apparatus 205-c may include an environment adjustment module 215-c, which may be an example of the environment adjustment module 215, 215-a, 215-b described with reference to FIGS. 2, 3, and 4. In some embodiments, apparatus 205-c may include an control panel, a control device, and/or another device, and the terms a control panel and a control device may be used synonymously.

Apparatus 205-c may also include components for bi-directional voice and/or data communications including components for transmitting communications and/or components for receiving communications. For example, apparatus 205-c may communicate bi-directionally with one or more of devices 150-a, 130-a, one or more sensor units 110-a, remote storage 140-a, and/or remote server 155-a, which may be an example of a server 155 of FIG. 1 that is remote. This bi-directional communication may be direct (e.g., apparatus 205-c communicating directly with remote storage 140-a) or indirect (e.g., apparatus 205-c communicating indirectly with remote server 155-a through remote storage 140-a).

The environment adjustment module 215-c may perform various operations as described above with reference to FIGS. 2-4, related to adjusting a home environment. In embodiments involving a lighting system, the environment adjustment module 215-c may among other things perform operations related to adjusting a lighting system (e.g., adjusting one or more lighting settings). Other examples may include those discussed in and/or contemplated by the present disclosure, including, but not limited to a television or system of televisions, a music system, a personal assistant system, a home theater system, a thermostat system, a humidifier system, a HVAC system, and/or a water system, among others.

Apparatus 205-c may also include a processor module 505, and memory 510 (including software/firmware code (SW) 515), an input/output controller module 520, a user interface module 525, a transceiver module 530, and one or more antennas 535 each of which may communicate—directly or indirectly—with one another (e.g., via one or more buses 540). The transceiver module 530 may communicate bi-directionally—via the one or more antennas 535, wired links, and/or wireless links—with one or more networks or remote devices as described above. For example, the transceiver module 530 may communicate bi-directionally with one or more of device 150-a, device 130-a, remote storage 140-a, and/or remote server 155-a. The transceiver module 530 may include a modem to modulate the packets and provide the modulated packets to the one or more antennas 535 for transmission, and to demodulate packets received from the one or more antennas 535. In some embodiments (not shown) the transceiver may be communicate bi-directionally with one or more of device 150-a, device 130-a, remote storage 140-a, and/or remote server 155-a through a wired connection without necessarily using antenna 535. While an apparatus or a control device (e.g., 205-c) may include a single antenna 535, the apparatus 205-c or the control device may also have multiple antennas 535 capable of concurrently transmitting or receiving multiple wired and/or wireless transmissions. In some embodiments, one element of apparatus 205-c (e.g., one or more antennas 535, transceiver module 530, etc.) may provide a direct connection to a remote server 155-a via a direct network link to the Internet via a POP (point of presence). In some embodiments, one element of apparatus 205-c (e.g., one or more antennas 535, transceiver module 530, etc.) may provide a connection using wireless techniques, including digital cellular telephone connection, Cellular Digital Packet Data (CDPD) connection, digital satellite data connection, and/or another connection.

The signals associated with system 500 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 535 and/or transceiver module 530 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 535 may receive signals or information specific and/or exclusive to itself. In other embodiments, each antenna 535 may receive signals or information not specific or exclusive to itself.

In some embodiments, one or more sensor units 110-a (e.g., motion, proximity, smoke, light, glass break, door, window, carbon monoxide, and/or another sensor) may connect to some element of system 500 via a network using one or more wired and/or wireless connections.

In some embodiments, the user interface module 525 may include an audio device, such as an external speaker system, an external display device such as a display screen, and/or an input device (e.g., remote control device interfaced with the user interface module 525 directly and/or through I/O controller module 520).

One or more buses 540 may allow data communication between one or more elements of apparatus 205-c (e.g., processor module 505, memory 510, I/O controller module 520, user interface module 525, etc.).

The memory 510 may include random access memory (RAM), read only memory (ROM), flash RAM, and/or other types. The memory 510 may store computer-readable, computer-executable software/firmware code 515 including instructions that, when executed, cause the processor module 505 to perform various functions described in this disclosure (e.g., initiating an adjustment of a lighting system, home theater system, water system, thermostat system, humidifier system, etc.). Alternatively, the software/firmware code 515 may not be directly executable by the processor module 505 but may cause a computer (e.g., when compiled and executed) to perform functions described herein. Alternatively, the computer-readable, computer-executable software/firmware code 515 may not be directly executable by the processor module 505 but may be configured to cause a computer (e.g., when compiled and executed) to perform functions described herein. The processor module 505 may include an intelligent hardware device, e.g., a central processing unit (CPU), a microcontroller, an application-specific integrated circuit (ASIC), etc.

In some embodiments, the memory 510 can contain, among other things, the Basic Input-Output system (BIOS) which may control basic hardware and/or software operation such as the interaction with peripheral components or devices. For example, the environment adjustment module 215-c to implement the present systems and methods may be stored within the system memory 510. Applications resident with system 500 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 530, one or more antennas 535, etc.).

Many other devices and/or subsystems may be connected to one or may be included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of system memory 510 or other memory. The operating system provided on I/O controller module 520 may be iOS®, ANDROID®, MS-DOS®, MS-WINDOWS®, OS/2®, UNIX®, LINUX®, or another known operating system.

The transceiver module 530 may include a modem configured to modulate the packets and provide the modulated packets to the antennas 535 for transmission and/or to demodulate packets received from the antennas 535. While an apparatus (e.g., 205-c) (or a control panel or control device in some embodiments) may include a single antenna 535, apparatus (e.g., 205-c) may have multiple antennas 535 capable of concurrently transmitting and/or receiving multiple wireless transmissions.

The apparatus 205-c may include an environment adjustment module 215-c, which may perform the functions described above for the environmental adjustment modules 215, 215-a, and 215-b of apparatus 205, 205-a, and 205-b of FIGS. 2, 3 and 4. The apparatus 205-c may also include other types of modules contemplated herein.

Figure 6:
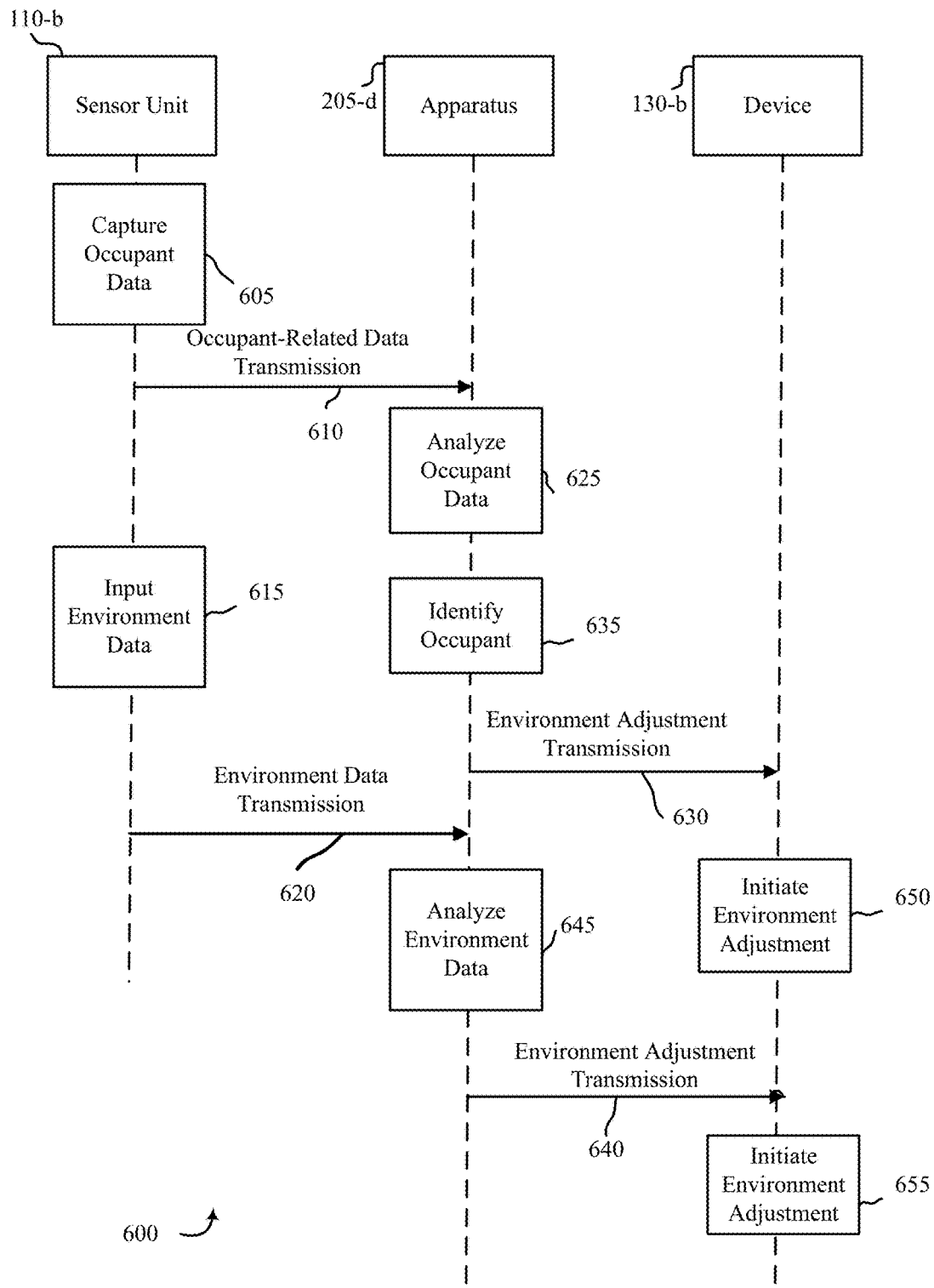
FIG. 6 shows a block diagram of a data flow relating to a security and/or an automation system, in accordance with various aspects of this disclosure.

FIG. 6 shows a block diagram 600 relating to a security and/or an automation system, in accordance with various aspects of this disclosure. The block diagram 600 illustrates the flow of data and related method steps between a sensor unit 110-b, an apparatus 205-d, and/or a device 130-b, among other components. In some embodiments, these one or more components may communicate with each other using similar, different, exactly the same, and/or other variations of different signals and/or methods. The sensor unit 110-b may be examples of one or more aspects of the sensor units 110 and sensor unit 110-a from FIGS. 1 and/or 5, among others. Other additional and/or alternative sensors can be employed. Apparatus 205-d may be an example of one of more aspects of the apparatuses 105, 205, 205-a, 205-b, 205-c from FIGS. 1-5, among others. Device 130-b may be an example of one or more aspects of device 130 of FIG. 1, and/or device 130-a of FIG. 5, among others. In some cases, sensor unit 110-b, apparatus 205-d, and device 130-b may include a computing device (e.g., local computing devices 115 and 120 and/or remote computing device 140) such as a smart phone, desktop, laptop, remote server (e.g., server 155 of FIG. 1), and/or may include a storage device and/or database. In some cases, one or more operations shown in FIG. 6 may be performed by another device, such as a remote server, using one or more communications connections.

In some embodiments, the sensor unit 110-b may capture and/or receive data relating to an occupant, as shown at block 605. Such data may include for example, but is not limited to, height, weight, color, width, body shape, article of clothing, footwear, carried item, glasses, facial characteristic, mobile device, voice, gait, motion characteristic(s) of an occupant (including speed, direction, path, etc.), identifying cell phone data, etc. Some embodiments of the sensor unit 110-b may (but are not limited to) sense motion of an occupant utilizing the visible spectrum, near-infrared, or infrared wavelengths. Some sensor unit 110-b embodiments may detect motion or movement of an occupant (e.g., whether a person or pet) based on the video/still image input. The sensor unit 110-b may also capture and/or receive data relating to an environment, as shown at block 615. Such data may include, but is not limited to, conditions relating to a home such as, for example but not limited to ambient light level, weather patterns, temperature, time, detected object in the home, presence of more than one occupant, activity level of occupant(s), ambient noise level, water temperature, humidity level, etc. Such data may also include occupant interaction with home features. Home features may include but not be limited to for example an appliance, water valve, electronic device (or plurality of electronic devices such as those forming a home theater system), fireplace, door, lock, cupboard, sound producing devices (e.g., speakers), some combination, and/or others.

As shown by arrows 610 and 620, one step may involve the apparatus 205-d receiving transmitted data from the sensor unit 110-b. At box 625, a subsequent or second step may involve the apparatus 205-d analyzing the data and, at box 635, identifying the occupant based at least in part on the data relating to the occupant. For example, in some embodiments, the apparatus 205-d may compare the movement and/or the relative size detected by image data to one or more saved occupant profiles. The movement(s) may be compared to past movements of one or more occupants and/or a database of known movements. This may include comparing a current movement to the database of known movements to determine that the current movement is the same as one or more known movements. Alternatively and/or additionally, this may include comparing a current movement to the database of known movements to determine that the current movement is different from one or more known movements. This determination related to movement (and/or other characteristics) may influence or relate to identifying of an occupant, among other things. In some embodiments, the apparatus 205-d may determine one or more characteristics from the data received from the sensor units 110-b to reduce false positives. For example, if certain captured occupant data 605 (such as the characteristics or features of an occupant) captured by a sensor unit 110-b suggests one identity of an occupant, yet other captured occupant-related data 605 (such as time of day or particular motion or movement of the occupant) conflicts with that identity, the apparatus 205-d may delay making a definitive determination regarding the identity of the applicant until sufficient data is captured and analyzed to allow an identification of the occupant with a threshold level of confidence.

At box 645, a subsequent or third operation may involve the apparatus 205-*d* analyzing the data related to the environment. However, this operation may also occur before the second step in some embodiments. In addition, in some embodiments, the occupant-related data transmission 610 and environment data transmission 620 may be ongoing and/or overlapping in time.

As shown by arrows 630 and 640, the apparatus 205-*d* may also be in communication with the device 130-*b*. In addition, as shown by boxes 650, an adjustment to the environment may be initiated based at least in part on the identifying. In some embodiments the adjustment to the environment may include an adjustment to a lighting system. Alternatively, an adjustment to the environment may not be initiated until both after the occupant is identified and after the environment data is analyzed, as shown by box 645, arrow 640 and box 655, with the adjustment of the environment being initiated based at least in part on the identifying of the occupant and also based at least in part on the analyzing of the environment data. Alternatively, an adjustment to the environment may first be initiated at least in part based on the identifying of the occupant, and later another adjustment to the environment may be initiated based on environment data, as shown by boxes 625, 635, 645, 650, 655, and arrows 630 and 640. The adjustments to the environment may or may not be sequential in time, and may involve adjustments to more than one device 130-*b*. In some embodiments there may be a flow of adjustments based on different, changing occupants and changing environment.

In one embodiment, the environment adjustment initiated at box 650 may be based on an identified occupant's environment preferences. In one embodiment involving a lighting system, a sensor unit 110-*b* may allow identification of a particular person who has entered the room, and the apparatus 205-*d* may signal to devices 130-*b* that are lights to turn on and adjust to light levels or settings previously customized by/for that person. Such settings might include, for example, not only a brightness level, but how that brightness level is reached (e.g., gradually increasing brightness over a predetermined period), which lights in a room or around a home are turned on and for how long, etc. By way of further example, motion detected in an area of one room next to a window looking over a yard or into another room might result in a light or lights also being turned on in the yard or another room. Moreover, that determination of which lights to adjust may be based in part by the actual preferences of the occupant, or by the preferences determined for a particular group of occupants, a time of day, a triggered event, and/or some combination, among other things. In addition, as mentioned over, environment preferences are not limited to those pertaining to a lighting system and may also include, for example, settings for a home theater system, thermostat system, water system, humidifier system, etc.

By way of further example, upon sensing the motion of an identified occupant at a predetermined time and/or at a predetermined location, an adjustment or several adjustments to a lighting system may be initiated. In one embodiment, for example, in the case of a waking occupant during a nighttime or early-morning hour, adjustments to the lighting system may be initiated to gradually increase brightness level until a desired predetermined level is reached. In another embodiment, after the sensor unit 110-*b* senses that an identified occupant is moving and waking from a bed at a night-time hour, an adjustment may be initiated to the lighting system that illuminates a path to a bathroom at a preferred brightness level, and that turns off the light as the occupant returns to a bed. In another embodiment, after the sensor unit 110-*b* senses that an identified occupant is moving and waking from a bed at an early morning hour, an adjustment may be initiated to the lighting system that illuminates a path to a shower and provides light in the shower at a preferred brightness level, and that turns on the shower to a preferred water temperature. The particular manner that the lights may turn on or off, or the path of an occupant, and other environmental settings, may be additionally customized according to user preference and/or user identification, and also in some embodiments using analytics to determine user preferences even without express or overt user command.

In another embodiment, for example, when more than one occupant is identified (and where, e.g., a first occupant and a second occupant may have conflicting preferences for an environment), the preferences of the first occupant may be given greater priority than the preferences of the second occupant in a predetermined manner (or vice versa), and an adjustment to an environment may be initiated at least partially on that basis. Alternatively, in such instances, the adjustment may be initiated based on a set of rules governing different situations.

For example, in one embodiment where a first occupant has known environment preferences and a second occupant does not, priority may be given to the first occupant. Relatedly, where a first occupant is a resident of a home and a second occupant is not, priority may be given to the resident of the home. Alternatively, where the environment preferences of (and/or other characteristics relating to) the second occupant who is not a resident of the home are known, priority may be given to the second occupant, who is a guest. For example, a preference and/or a characteristics (e.g., age, weight, height, health, actions, detected keywords) may impact the priority level given to the second occupant. In addition, certain environment settings may be based on the averages of and/or other relationships of some group members.

For example, if there is a group of occupants who prefer varying temperatures of a room, a temperature may be set that constitutes a "middle ground" for the occupants. Alternatively, environment settings may be selected from among a first occupant's preferences and a second occupant's preferences by taking turns between the two (e.g., giving priority to the first occupant's environment preferences for a first day or time of day, but giving priority to the second occupant's environment preferences a second day or time of day, and so forth). In some embodiments, a first occupant—e.g., a wife—and a second occupant—e.g., a husband—may proactively input settings giving one of the occupant's environment preferences priority. Some environment preferences for more than one occupant may also relate to safety. For example, if a first occupant prefers very dim light while walking at night, and a second occupant in a same room prefers brighter light (or even if the second occupant prefers dim light as well), a brighter setting lighting adjustment may be initiated to ensure that both occupants can operate within one or more areas safely and securely.

The data received by the apparatus 205-*d* may also be logged and analyzed, and the initiated environment adjustment may be based at least partially on that analysis. For example, some data may be correlated with certain occupant profiles, and (similar in some aspects to the description regarding the predicting module 435 and the preference determining module 445 above) an occupant's behavior may be predicted and a environment adjustment may be initiated based at least in part on the predicted behavior. For example, in an embodiment involving a lighting system, a device 130-*b* that is a light may be adjusted at a second location ahead of an occupant's first location, based on the probability and/or a determination that (based on the logged data and/or predicted behavior) the identified occupant will take a certain path or route involving the second location within a certain amount of time. By way of further example, the sensor units 110-*b* may capture an identified occupant's first path and/or one or more repeated paths throughout a home at a first time and/or at certain times and capture such data, which data may be analyzed with respect to that occupant and/or other occupants. For example, in a specific example of a sensor unit embodiment 110-*b* that is a camera, when the motion of the identified occupant is no longer detected within the field of view (i.e., when the occupant has left a room), a device 130-*b* that is a light may be instructed to wait to turn off based on (among other factors) a threshold probability that the particular identified occupant will return within a certain amount of time. In addition or alternatively, a device 130-*b* that is a light may be dimmed for a certain amount of time based on the probability that, based on the logged data and/or predicted behavior, the identified occupant will return within a certain amount of time. More specifically, if the identified occupant does not return within the predetermined amount of time, the dimmed light may turn off. If the identified occupant does return, the occupant may be re-adjusted to a different (e.g., higher, lower) brightness setting.

In some embodiments, sensor units 110-*b* described herein may detect ambient light, which data may be received and analyzed by the apparatus 205-*d*, and an adjustment to a lighting system may be initiated through a device 130-*b* based at least in part on that data, according to occupant preference or some predetermined setting irrespective of occupant. Alternatively, instead of determining the level of ambient light, an adjustment to an environment such as a lighting system may be initiated based at least in part on time of day, by for example adjusting light settings at different times of day—e.g., a low level of light during a nighttime hour, and a brighter light level during an "active" time in the home. In addition or alternatively, an adjustment to a lighting system may be based at least in part on both ambient light and time of day. For example, a sensor unit 110-*b* detecting a low level of ambient light might by itself in some instances lead to a higher brightness level. However, if analysis of data indicates a night time hour and a low level of activity of occupants—suggesting perhaps that occupants intend to sleep during that time—an adjustment to the lighting system may be initiated instead involving lower brightness level (e.g., a "candlelight" level).

Types of adjustments to an environment may vary and of course are not limited to the examples described herein. For example, with regard to an adjustment to a lighting system, some lighting setting adjustments may also be related to weather conditions outside the home (e.g., "cool" or "warm" light settings), among other parameters and/or possibilities. Sensor units 110-*b* and apparatus 205-*b* may also allow logging of different conditions relating to a home, and an initiated adjustment to an environment through a device 130-*b* may be based at least in part on analysis of that data. For example, in a lighting system embodiment, ambient light levels may be logged or recorded at certain times throughout the day. In addition or alternatively, other data received via a network 125 and a server 155, such as for example weather patterns (including level of overcast skies) may be analyzed. Based at least in part on the analysis of such data, an adjustment of lighting system may also be initiated.

Figure 7:
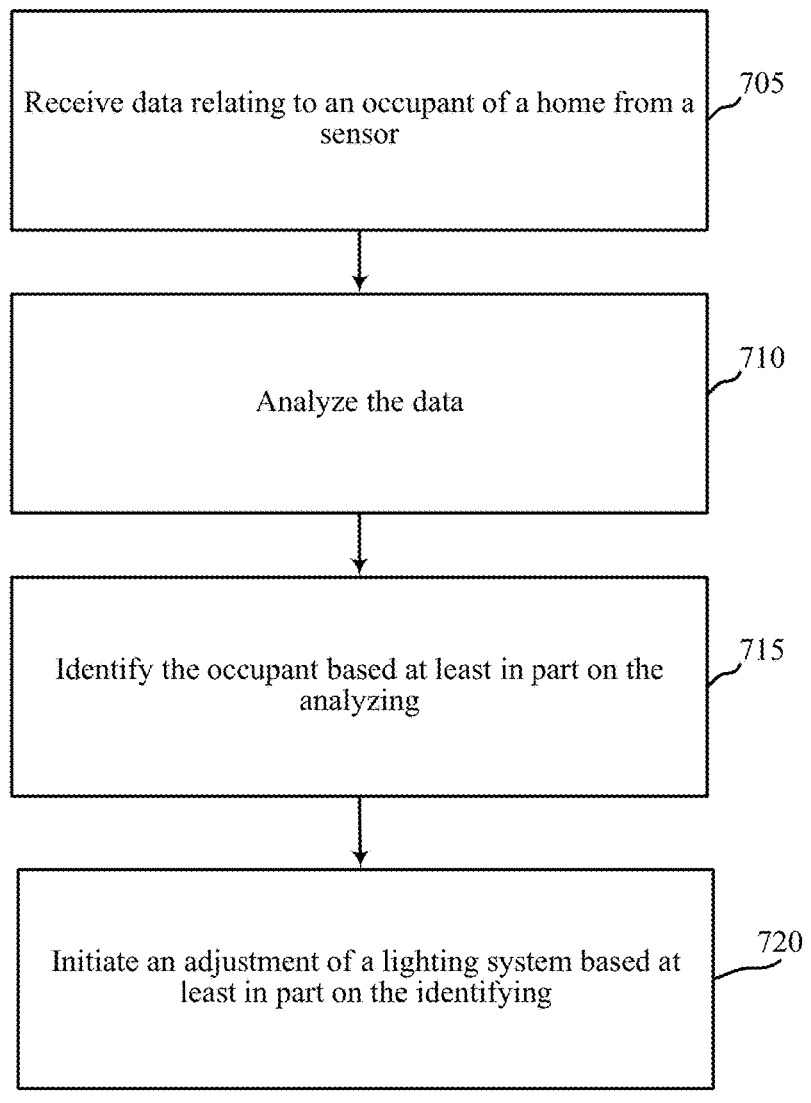
FIG. 7 is a flow chart illustrating an example of a method relating to a security and/or an automation system, in accordance with various aspects of this disclosure.

FIG. 7 is a flow chart illustrating an example of a method 700 for adjusting an environment based at least in part on an identity of at least one occupant, in accordance with various aspects of the present disclosure. For clarity, the method 700 is described below with reference to aspects of one or more of the apparatuses 105, 205, 205-*a*, 205-*b*, 205-*c*, 205-*d*, computing devices 115, 120, remote computing devices 140, 140-*a*, servers 155, 155-*a*, sensor units 110, 110-*a*, 110-*b*, devices 130, 130-*a*, 130-*b* described with reference to FIGS. 1-6. In some examples, apparatuses 105, 205, 205-*a*, 205-*b*, 205-*c*, 205-*d*, computing devices 115, 120, remote computing devices 140, 140-*a*, servers 155, 155-*a*, sensor units 110, 110-*a*, 110-*b*, and network 125 may execute one or more sets of codes to control the functional elements of the devices 130, 130-*a*, 130-*b* to perform the functions described below. Additionally or alternatively, the apparatuses 105, 205, 205-*a*, 205-*b*, 205-*c*, 205-*d*, computing devices 115, 120, remote computing devices 140, 140-*a*, servers 155, 155-*a*, sensor units 110, 110-*a*, 110-*b*, devices 130, 130-*a*, 130-*b* may perform one or more of the functions described below using special-purpose hardware.

At block 705, the method 700 may include receiving data relating to an occupant of a home from a sensor. Such data may include the data relating to an occupant that is captured or received by the sensor unit 110-*b*, described above with respect to FIG. 6. For example, as such data may include but is not limited to, height, weight, color, width, body shape, article of clothing, footwear, carried item, glasses, facial characteristic, mobile device, voice, gait, velocity of pace, direction, path, and motion of an occupant, identifying cell phone data, skin texture, etc. However, not all the received data relating to an occupant must originate from the sensor unit 110-*b* and data relating to an occupant may come from other sources, such as a preexisting database, or from data received remotely via a network and a server (such as network 125 and server 155 of FIG. 1). The operations at block 705 may be performed using the receiver module 210, 210-*a*, 210-*b*, described with reference to FIGS. 2-4. "Home" as used herein may refer to a variety of structures, including dwellings, buildings, offices, etc., as well as the premises and/or properties pertaining to and/or surrounding the structures.

At block 710, the method 700 may include analyzing the data. The operations at block 710 may be performed using the environment adjustment module 215, 215-*a*, 215-*b*, 215-*c*, described with reference to FIGS. 2-5. Specific embodiments of the environment adjustment module 215-*a* may include an analyzing module 305, as shown in FIG. 3. The analyzing module may also include various modules for performing various functions. In one embodiment the analyzing module 305-*a* may include a search module 425, a comparing module 430, and a predicting module 435, as shown in FIG. 4.

At block 715, the method 700 may include identifying the occupant based at least in part on the analyzing. The occupant may be identified in a variety of ways, and in some embodiments such identification may involve one or more distinguishing features of the occupant. For example, the analysis may involve one or more and any combination of the data mentioned in the present disclosure. The operations at block 715 may be performed using the environment adjustment module 215, 215-*a*, 215-*b*, 215-*c*, described with reference to FIGS. 2-5. Specific embodiments of the environment adjustment module 215-a may include an identifying module 310, as shown in FIG. 3. The identifying module may also include various modules for performing various functions. In one specific embodiment the identifying module 310-a may include a matching module 460, a correlating module 440, and a profile creating module 455, as shown in FIG. 4.

At block 720, the method 700 may include initiating an adjustment of a lighting system based at least in part on the identifying. The adjustment may be to one particular component of the lighting system as well as a plurality of components. The adjustment may also include waiting to make the actual adjustment until a predetermined time passes and/or until a predicted event occurs. For example, an occupant may be identified in one room, and the occupant may further be detected as picking up a set of car keys. Based on analysis of this data, the occupant's behavior may be predicted, including predicting that the occupant will be moving towards the garage to get into and/or access a car. However, the adjustment to environment—for example, the turning on a light in the garage, the opening of a garage door, or the heating of the garage—may in some embodiments not occur until, e.g., the occupant moves within a predetermined distance from the garage. Or alternatively, this adjustment may occur automatically based on the received data and/or input relating to the identifying, analyzing, and/or determining one or more actions (e.g., picking up keys). The operations at block 720 may be performed using the transmitter module 220, 220-a, 220-b, transceiver module 530, antenna 535, and device 130, 130-a, 130-b described with reference to FIGS. 1-6.

Thus, the method 700 may provide for adjusting an environment relating to automation/security systems. It should be noted that the method 700 is just one implementation and that the operations of the method 700 may be rearranged or otherwise modified such that other implementations are possible.

Figure 8:
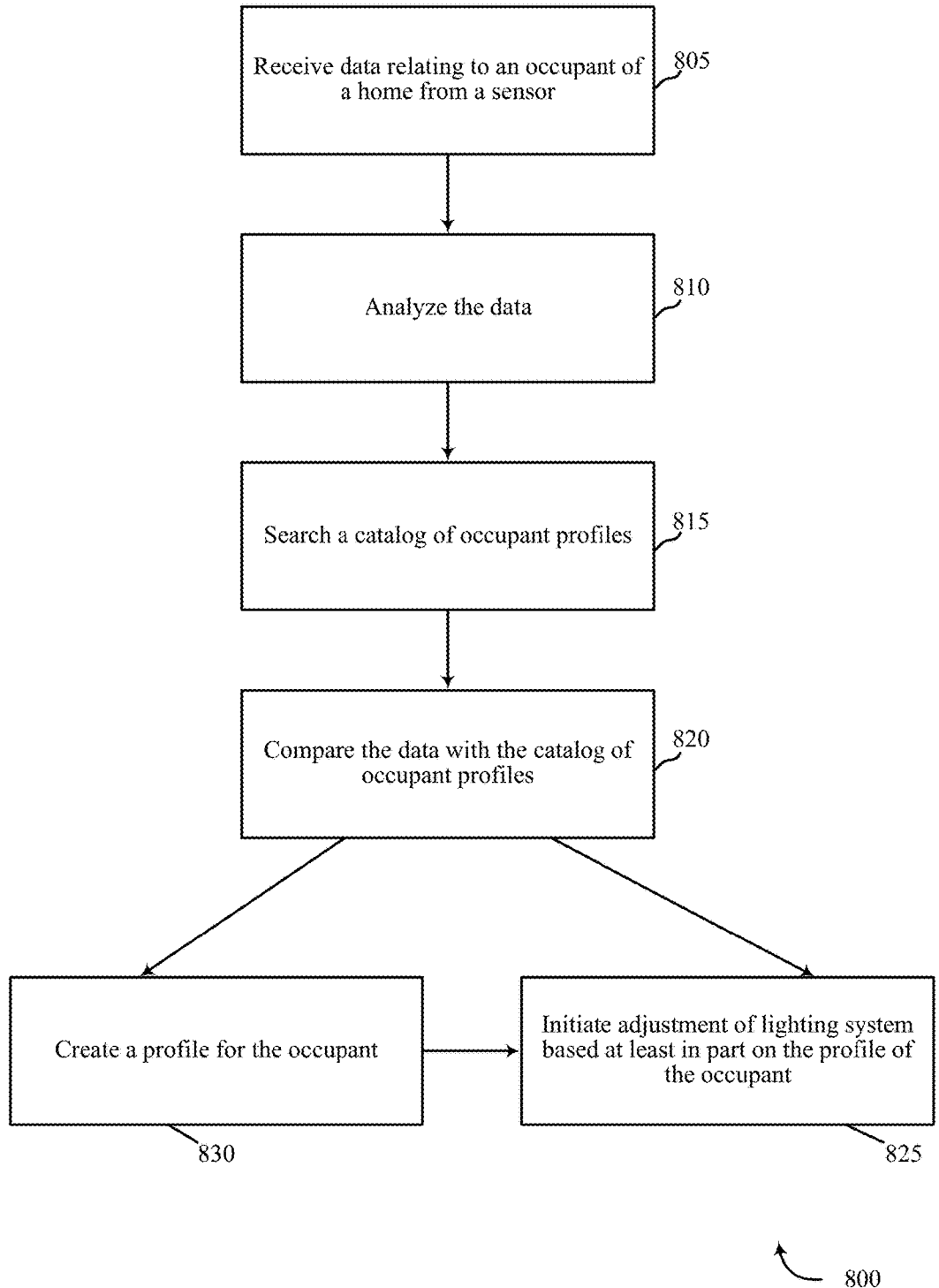
FIG. 8 is a flow chart illustrating an example of a method relating to a security and/or an automation system, in accordance with various aspects of this disclosure.

FIG. 8 is a flow chart illustrating an example of a method 800 for initiating an adjustment of a lighting system based at least in part on a profile of one or more occupants. For clarity, the method 800 is described below with reference to aspects of one or more of the apparatus 105, 205, 205-a, 205-b, 205-c, 205-d, computing devices 115, 120, remote computing device 140, 140-a, server 155, 155-a, sensor unit 110, 110-a, 110-b, device 130, 130-a, 130-b, and network 125 described with reference to FIGS. 1-6. In some examples, apparatus 105, 205, 205-a, 205-b, 205-c, 205-d, computing device 115, 120, remote computing device 140, 140-a, server 155, 155-a, sensor unit 110, 110-a, 110-b, may execute one or more sets of codes to control the functional elements of the device 130, 130-a, 130-b to perform the functions described below. Additionally or alternatively, the apparatus 105, 205, 205-a, 205-b, 205-c, 205-d, computing device 115, 120, remote computing device 140, 140-a, server 155, 155-a, sensor unit 110, 110-a, 110-b, device 130, 130-a, 130-b may perform one or more of the functions described below using special-purpose hardware.

At block 805, the method 800 may include receiving data relating to an occupant of a home from a sensor. In some aspects, the operations at block 805 may be similar to those at block 705 shown in FIG. 7. For example, the operations at block 805 may be performed using the receiver module 210, 210-a, 210-b, described with reference to FIGS. 2-4.

At block 810, the method 800 may include analyzing the data. In some aspects, the operations at block 810 may be similar to those at block 710 shown in FIG. 7. The operations at block 810 may also be performed using the environment adjustment module 215, 215-a, 215-b, 215-c, described with reference to FIGS. 2-5.

At block 815, the method 800 may include searching a catalog of occupant profiles. The occupant profiles may include, among other things, one or more potentially identifying characteristics of particular occupants. In certain embodiments the catalog of occupant profiles may correspond to the residents of a home. In some such examples, received data from a sensor may suggest one or more physical characteristics (e.g., height of 5 feet 8 inches) that correspond to the profile of a particular resident. Such characteristics could include, for example, some or any combination of the examples described in the present disclosure, including, but not limited to, height, weight, color, width, body shape, article of clothing, footwear, carried item, glasses, facial characteristic, mobile device, voice, gait, velocity of pace, direction, path, and motion of an occupant, identifying cell phone data, skin texture, etc. In addition, in some embodiments certain characteristics may be given more or less weight for purposes of identifying, so that those characteristics may be searched first. The function of searching, in one embodiment, may include querying a database for occupant profiles having certain characteristics, and/or certain characteristics with particular values or range of values. The function of searching a catalog may vary in complexity, for example, according to number of occupant profiles and number or characteristics searched.

The operations at block 815 may also be performed using the environment adjustment module 215, 215-a, 215-b, 215-c, described with reference to FIGS. 2-5, among others. Some specific embodiments of the environment adjustment module 215-a may include an analyzing module 305, as shown in FIG. 3, which may perform the operations at block 815. One particular embodiment of the environment adjustment module 215-b including an analyzing module 305-a, may include a search module 425, as shown in FIG. 4, which may perform the operations at block 815. In addition, the operations at block 815 may involve a database such as database 450 shown in FIG. 4, whether or not the database is a component of apparatus 105, 205, 205-a, 205-b, 205-c, 205-d, computing device 115, 120, remote computing device 140, 140-a, communicated to apparatus 105, 205, 205-a, 205-b, 205-c, 205-d remotely through network 125 and server 155, 155-a (and regardless of whether or not apparatus 105, 205, 205-a, 205-b, 205-c, 205-d itself is a component of computing device 115, 120, or remote computing device 140, 140-a).

At block 820, the method 800 may also include comparing the data with the catalog of occupant profiles to identify a profile of the occupant. The operations at block 820 may also be performed using the environment adjustment module 215, 215-a, 215-b, 215-c, described with reference to FIGS. 2-5. As explained in this disclosure, some specific embodiments of the environment adjustment module 215-a may include an analyzing module 305, as shown in FIG. 3, which may also perform the operations at block 820. One embodiment of the environment adjustment module 215-b including an analyzing module 305-a may include a comparing module 430, as shown in FIG. 4, which may perform the operations at block 820. The operations at block 820 may also involve a database as database 450 of FIG. 4.

Comparing the data with the catalog of occupant profiles may in some embodiments include comparing whether or not the received data relating to the occupant also relates to a particular occupant profile. If so, comparing the data may include matching the received data (e.g, similar gait, speed, motion, article of clothing, and/or identifying cell phone, physical characteristics such as height, weight, skin color, skin textures, facial features, etc.) with a particular profile in the catalog so as to identify the occupant within a threshold level of confidence. The function of comparing the data may vary in complexity according to, for example, number of occupant profiles and data points and how many identifying features are needed in order match data with a single occupant profile. The method 800 may also include initiating an adjustment of a lighting system based at least in part on the occupant profile, as shown at block 825. For example, the occupant profile may include lighting system preferences of the occupant. The operations at block 825 may be performed using the transmitter module 220, 220-a, 220-b, transceiver module 530, antenna 535, and device 130, 130-a, 130-b described with reference to FIGS. 1-6.

If the data relating to the occupant does not also relate to a particular occupant profile, the method 800 may include creating a profile for the occupant, as shown at block 830. The operations at block 830 may also be performed using the environment adjustment module 215, 215-a, 215-b, 215-c, described with reference to FIGS. 2-5. In one specific embodiment the environment adjustment 215-a module may include an identifying module 310, as shown in FIG. 3. The identifying module 310-a in one embodiment may include among other things a profile creating module 455, as shown in FIG. 4, which may in that embodiment perform the operations at block 830. The operations at block 830 may also involve a database as discussed. Based on a newly created profile, the method 800 may include initiating an adjustment of the lighting system, as shown at block 825. (In some embodiments, and similar in at least some aspects to block 925 described in more detail below with respect to FIG. 9, the method 800 may include correlating data relating to the occupant with the profile of the occupant, whether the profile was newly-created or already-existing).

Alternatively, in some embodiments, analyzing the received data may involve matching an occupant to a group of known occupants. Such groups may be based in some embodiments on user input or determined automatically in other embodiments. For example, over time a number of occupants may select similar or the same environment settings, or alternatively certain occupants that share certain characteristics may select similar or the same environment settings. An occupant may be matched to such a group, due for example to some similar characteristic in common with some or all occupants of the group. This matching may in some examples affect the environment adjustment made. For example, in one embodiment where what particular adjustment to make to an environment may be unknown (or at least unknown to a certain degree of confidence), matching may involve analysis of the motion, features, or behavior of the occupant to ascribe the environment preferences of a certain known group of occupants to the occupant. By way of further example, if a first occupant is identified as a child, and other identified child occupants have selected certain environment settings, similar and/or same setting may be ascribed to the first occupant. Relatedly, a parent could input certain settings for children that apply when an occupant is identified as a child. Similar applications could involve occupants that are elderly, or adults, etc. Other embodiments are also contemplated. For example, matching may involve identifying a first occupant with a group of occupants that are present within a predetermined area along with the first occupant. Such matching may relate in some embodiments to ascribing to the first occupant the selected preferences of that group. There may also be exceptions to such a matching embodiment. For example, in one embodiment, although the selected preferences of the group, and/or the determined preferences of the group, may be ascribed to the first occupant when the first occupant is with the group of occupants, different adjustments may nevertheless still be initiated when the first occupant is not with the group.

Some sensor unit 110-b embodiments may detect motion or movement of an occupant (e.g., whether a person or pet) based on the video/still image input. The sensor unit 110-b may also capture and/or receive data relating to an environment, as shown at block 615. Such data may include, but is not limited to, conditions relating to a home such as, for example but not limited to ambient light level, weather patterns, temperature, time, detected object in the home, presence of more than one occupant, activity level of occupant(s), ambient noise level, water temperature, humidity level, etc. Such data may also include occupant interaction with one or more home features. Home features may include but not be limited to for example an appliance, water valve, electronic device (or plurality of electronic devices such as those forming a home theater system), fireplace, door, lock, cupboard, sound producing devices (e.g., speakers), some combination, and/or others.

Figure 9:
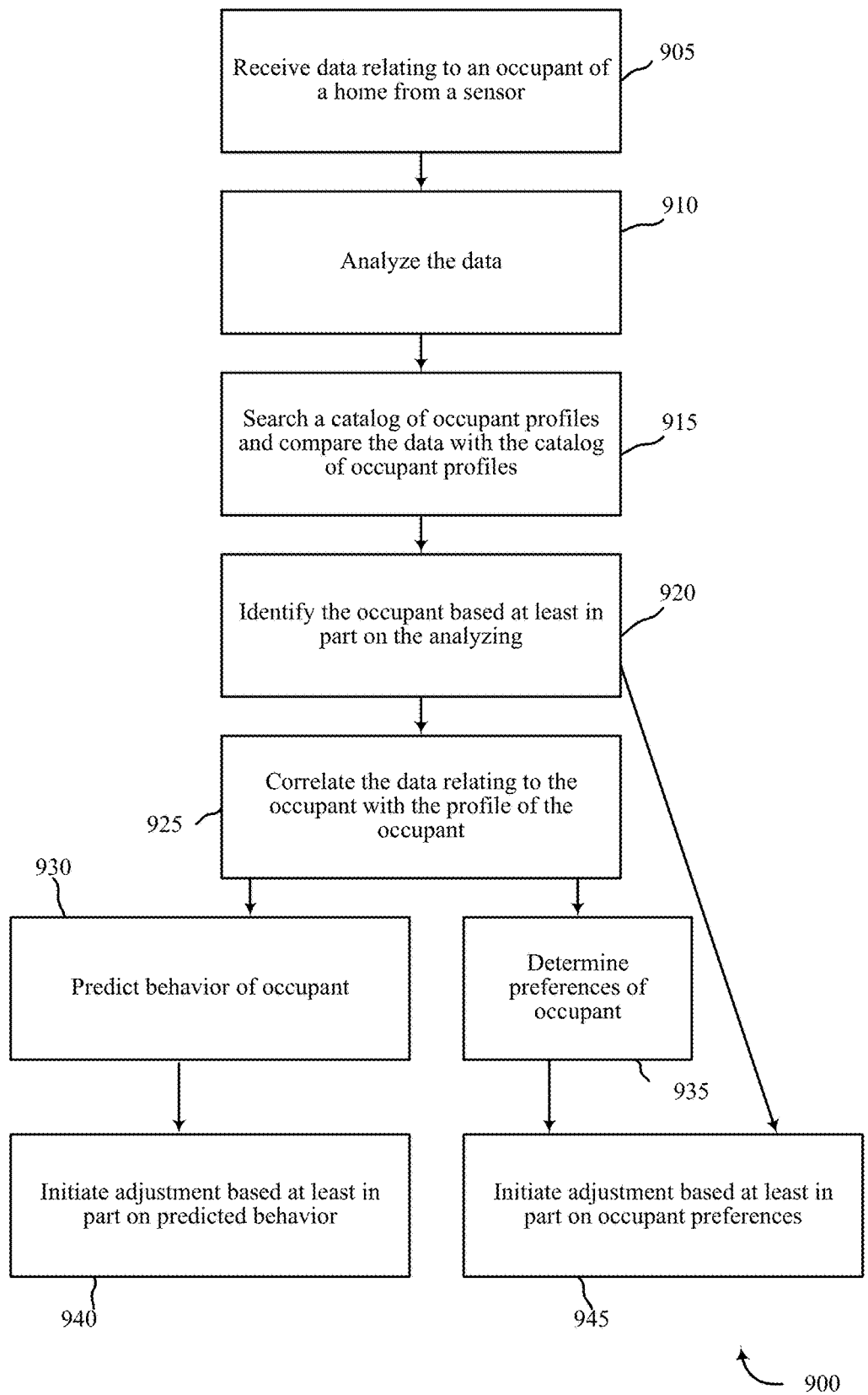
FIG. 9 is a flow chart illustrating an example of a method relating to a security and/or an automation system, in accordance with various aspects of this disclosure.

FIG. 9 is a flowchart illustrating an example of a method 900 for identifying an occupant based on analyzing received data relating to an occupant. For clarity, the method 900 is described below with reference to aspects of one or more of the apparatus 105, 205, 205-a, 205-b, 205-c, 205-d, computing devices 115, 120, remote computing device 140, 140-a, server 155, 155-a, sensor unit 110, 110-a, 110-b, device 130, 130-a, 130-b described with reference to FIGS. 1-6. In some examples, apparatus 105, 205, 205-a, 205-b, 205-c, 205-d, computing device 115, 120, remote computing device 140, 140-a, server 155, 155-a, sensor unit 110, 110-a, 110-b, may execute one or more sets of codes to control the functional elements of the device 130, 130-a, 130-b to perform the functions described below. Additionally or alternatively, the apparatus 105, 205, 205-a, 205-b, 205-c, 205-d, computing device 115, 120, remote computing device 140, 140-a, server 155, 155-a, sensor unit 110, 110-a, 110-b, device 130, 130-a, 130-b may perform one or more of the functions described below using special-purpose hardware.

As shown in FIG. 9 (and similar to FIGS. 7 and 8 with respect to methods 700 and 800 respectively), the method 900 may include, at block 905, receiving data relating to an occupant of a home from a sensor. The operations at block 905 may be performed using the receiver module 210, 210-a, 210-b, described with reference to FIGS. 2-4. The method 900 may also include, at block 910, analyzing the data. The operations at block 910 may also be performed using the environment adjustment module 215, 215-a, 215-b, 215-c, described with reference to FIGS. 2-5.

At block 915, the method 900 may include searching a catalog of occupant profiles and comparing the data with the catalog of occupant profiles to identify a profile of the occupant (in aspects similar to that described in FIG. 8 at blocks 815 and 820). The operations at block 915 may also be performed using the environment adjustment module 215, 215-a, 215-b, 215-c, described with reference to FIGS. 2-5.

At block 920, the method 900 may include identifying the occupant based at least in part on the analyzing. The operations at block 915 may also be performed using the environment adjustment module 215, 215-a, 215-b, 215-c, described with reference to FIGS. 2-5. Some specific embodiments of the environment adjustment module 215-a may include an identifying module 310, as shown in FIG. 3, which may perform the operations at block 915.

As shown at block 945, in some embodiments, once the occupant is identified (at block 920), an adjustment to an environment may be initiated based at least in part on occupant preferences. In some embodiments involving a light system, the occupant preferences may include lighting preferences. In some embodiments, the lighting preferences may be customizable by the occupant, and in one embodiment, may be inputted by the occupant using one or more of computing devices 115, 120, and remote computing device 140, 140-a. In some embodiments (not shown), the data may be received from a sensor unit 110, 110-a, 110-b that is a mobile device of the occupant that also contains the occupant's environment preferences. Alternatively, a sensor unit 110, 110-a, 110-b may detect the mobile device phone via Bluetooth, Wi-Fi, and/or another method and relay data from the relating to the occupant from the mobile device to the apparatus 105, 205, 205-a, 205-b, 205-c, 205-d. The operations at block 945 may be performed using the transmitter module 220, 220-a, 220-b, transceiver module 530, antenna 535, and device 130, 130-a, 130-b described with reference to FIGS. 1-6. In some aspects, initiating an adjustment to an environment may be used synonymously with initiating an adjustment to a device 130, 130-a, 130-b, as the adjustment to the device 130, 130-a, 130-b may result to an adjustment to the environment.

In addition, as shown at block 925, in some embodiments, the method 900 may include correlating data relating to the occupant with the profile of the occupant. Such data in some embodiments may be recorded, and may in some embodiments include, for example, an occupant's adjustment or past adjustments of the lighting system. In other aspects, the correlated data may include tracking an occupant's geolocation or otherwise recording the pathways and routes of an occupant through (and outside) a home, including rooms, doors used, destinations, and corresponding times, building features interacted with, etc. Thus, data may include not only selected lighting settings but also other selected environment settings such as for example but not limited to temperature, humidity, music, television channels, fireplace settings, water temperature, etc. In addition, such correlated, logged data may relate to more than one occupant and include certain environment settings selected when a group of occupants share occupancy of a room or parts of a home.

In some embodiments, correlating data may also be an ongoing process, involving logging and analyzing additional data relating to an occupant (or more than one occupant) as it is received, and updating the profile of an occupant and/or occupants accordingly. The operations at block 925 may be performed using the environment adjustment module 215, 215-a, 215-b, 215-c, described with reference to FIGS. 2-5. Some specific embodiments of the environment adjustment module 215-a may include an analyzing module 305, as shown in FIG. 3, which may perform the operations at block 925. One particular embodiment of the environment adjustment module 215-b including an analyzing module 305-a may include a correlating module 440, as shown in FIG. 4, which may perform the operations at block 925. Some of the operations at block 925 (and at other blocks mentioned herein) may also involve a database as discussed.

At block 930, the method 900 may include predicting behavior of the occupant. Such predicting in some embodiments may be based at least in part on the correlated data relating to the occupant and/or other data associated with the occupant's profile. The predicted behavior may be determined analyzing the correlated data, potentially using analytics. The operations at block 935 may be performed using the environment adjustment module 215, 215-a, 215-b, 215-c, described with reference to FIGS. 2-5. Some specific embodiments of the environment adjustment module 215-a may include an adjusting module 315, as shown in FIG. 3, which may perform the operations at block 935. As shown at block 940, in some embodiments, once the occupant's behavior is predicted as described above, an adjustment may be initiated based at least in part on the occupant's predicted behavior and/or lighting preferences. Some examples may relate in some aspects to those examples discussed above in with reference to FIG. 6, among others.

Several other examples of adjusting an environment based at least in part on predicted behavior of an occupant, and/or potentially derived from logged correlated data, are provided for purposes of non-limiting illustration as follows. In one example, adjusting an environment may include illuminating the occupant's path to the vehicle that the occupant will use to leave the house to exit for work and/or another appointment, based on the identity of an occupant, a time and/or a day (e.g., weekday, weekend day) when the occupant customarily leaves a home for work, and potentially a detected object (e.g., a brief case, a lunch box) and/or attire or other feature (e.g., a uniform, a suit, a tie) indicative that the occupant is going to work. In another example, a pathway may be illuminated from a child's bedroom to a parent's bedroom, based on received data identifying a child in a bedroom at a nighttime hour, motion indicating that the child has awaken, and correlated data showing the customary path of the child under similar circumstances to the parent's bedroom. In another example, lights in a home may illuminate a path to a safe room or spot in a home for identified occupants in the midst of an emergency weather warning, such as a tornado warning. In another example, a path may be illuminated to a bathroom for a child based on the identity of the child, and a time of night and motions that may have in past been correlated with a child engaging in a detected behavior during the night (e.g., falling, crying, entering a parent's room, asking a parent for help, wetting a bed). In related examples, a light may turn on in a child's room based on detected behavior of and/or data relating to a child (e.g., position, noises, crying, words spoken, actions taken, phrases spoken, position), or alternatively a light may turn on in a parent's room based on the detected behavior of and/or data relating to one or more children (e.g., the child is crying). In some such embodiments the lights may turn on to a setting that may indicate to the parent the status of the child (e.g., flashing lights in a predetermined pattern).

As shown in block 935, the method 900 may also include determining environment preferences of an occupant (or group of occupants). In some embodiments, determining environment preferences may be based on the correlated data, and may be determined from or included within the profile of the occupant. The operations at block 935 may be performed using the environment adjustment module 215, 215-a, 215-b, 215-c, described with reference to FIGS. 2-5. Some specific embodiments of the environment adjustment module 215-a may include an analyzing module 305, as shown in FIG. 3, which may perform the operations at block 925. One particular embodiment of the environment adjustment module 215-b including an analyzing module 305-a, may include a preference determining module 445, as shown in FIG. 4, which may perform the operations at block 935. By way of example, preferences may be determined according to user inputted customizations, default preferences, and/or past selected preferences of an occupant. For example, if an occupant selects a certain environment (e.g., a lighting) adjustment, the selection may be considered the occupant's preference. Moreover, some embodiments may take into account certain conditions when the selection is made, which data may be captured by sensors. In one embodiment, preferences may be determined during an initial trial period, or during some other period where sensors are alerted to monitor and track the environment selections of an occupant. In other embodiments, preferences may be determined for an occupant on an ongoing basis. In other embodiments, a user may input lighting preferences through a computing device (such as local computing devices 115, 120 and/or remote computing device 140), such as through a mobile device and/or an application thereon. In some embodiments, an occupant may input preferences utilizing computerized voice recognition. As shown at block 945, in some embodiments, once the occupant's environment preferences are determined as described above, an adjustment may be initiated based at least in part on those preferences. In some instances, such adjustments may include an adjustment to a device and may occur automatically. In an embodiment involving a lighting system, for example, an adjustment may be initiated automatically based at least in part on the occupant's determined lighting preferences.

The preceding examples of the method 900 may or may not require all the operations of all boxes mentioned above of method 900. The operations at block 940 may be performed, for example, using the transmitter module 220, 220-*a*, 220-*b*, transceiver module 530, antenna 535, and device 130, 130-*a*, 130-*b* described with reference to FIGS. 1-6.

Figure 10:
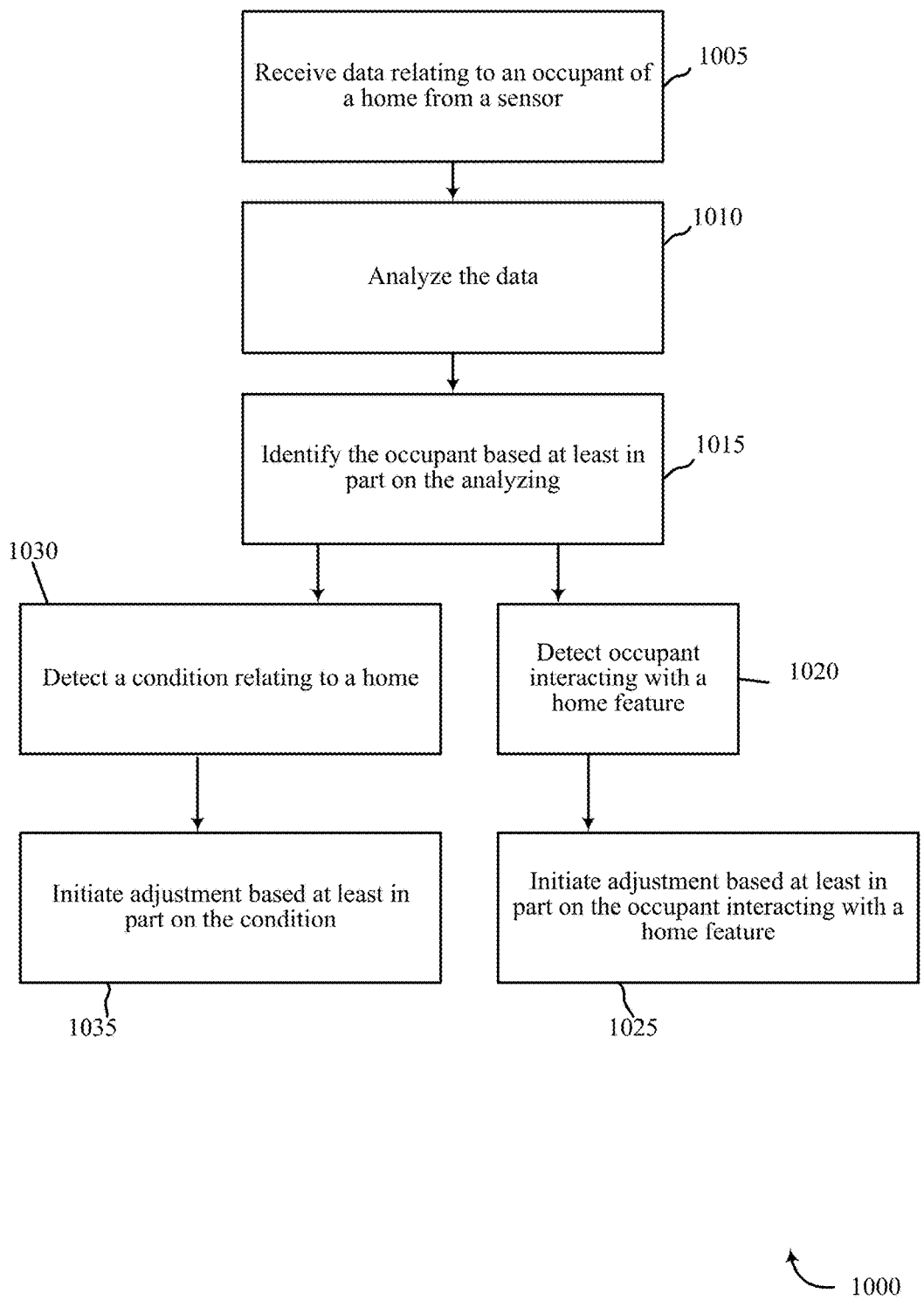
FIG. 10 is a flow chart illustrating an example of a method relating to a security and/or an automation system, in accordance with various aspects of this disclosure.

FIG. 10 is a flowchart illustrating an example of a method 1000 for identifying an occupant based on analyzing received data. For clarity, the method 1000 is described below with reference to aspects of one or more of the apparatus 105, 205, 205-*a*, 205-*b*, 205-*c*, 205-*d*, computing devices 115, 120, remote computing device 140, 140-*a*, server 155, 155-*a*, sensor unit 110, 110-*a*, 110-*b*, device 130, 130-*a*, 130-*b* described with reference to FIGS. 1-6. In some examples, apparatus 105, 205, 205-*a*, 205-*b*, 205-*c*, 205-*d*, computing device 115, 120, remote computing device 140, 140-*a*, server 155, 155-*a*, sensor unit 110, 110-*a*, 110-*b*, may execute one or more sets of codes to control the functional elements of the device 130, 130-*a*, 130-*b* to perform the functions described below. Additionally or alternatively, the apparatus 105, 205, 205-*a*, 205-*b*, 205-*c*, 205-*d*, computing device 115, 120, remote computing device 140, 140-*a*, server 155, 155-*a*, sensor unit 110, 110-*a*, 110-*b*, device 130, 130-*a*, 130-*b* may perform one or more of the functions described below using special-purpose hardware.

As shown in FIG. 10 (and similar to FIGS. 7-9 with respect to methods 700, 800, and 900 respectively), the method 1000 may include, at block 1005, receiving data relating to an occupant of a home from a sensor. The operations at block 1005 may be performed using the receiver module 210, 210-*a*, 210-*b*, described with reference to FIGS. 2-4.

The method 1000 may also include (and similar to FIGS. 7-9 with respect to methods 700, 800, and 900 respectively), at block 1005, analyzing the data. The operations at block 1005 may also be performed using the environment adjustment module 215, 215-*a*, 215-*b*, 215-*c*, described with reference to FIGS. 2-5.

At block 1015, the method 1000 may include identifying the occupant based at least in part on the analyzing. The operations at block 1015 may also be performed using the environment adjustment module 215, 215-*a*, 215-*b*, 215-*c*, described with reference to FIGS. 2-5. Some specific embodiments of the environment adjustment module 215-*a* may include an identifying module 310, as shown in FIG. 3, which may perform the operations at block 1015.

At block 1020, the method 1000 may further include detecting an occupant interacting with a home feature. Home features may include but not be limited to an appliance, water valve, electronic device, fireplace, door, lock, or a cupboard. The operations at block 1020 may be performed by a sensor unit 110, 110-*a*, 110-*b*. In addition, at block 1025, the method 1000 may include initiating an adjustment of the lighting system based at least in part on the occupant interacting with the home feature. For example, lights in a family room having a home theatre system may be dimmed as the occupant uses the home theatre system to watch a movie. In another example, a light may shine on a door lock as the occupant attempts to unlock the door using a key, etc. The operations at block 1025 may be performed using the transmitter module 220, 220-*a*, 220-*b*, transceiver module 530, antenna 535, and device 130, 130-*a*, 130-*b* described with reference to FIGS. 1-6.

At block 1030, the method 1000 may include detecting a condition relating to a home. Conditions may include, among other things, light level, time, temperature, occupancy, the presence of a detected object or of a second occupant, presence of an occupant within one or more groups, an activity level of a second occupant, a weather warning, an ambient noise level, some combination, and/or other thins. The operations at block 1030 may be performed by a sensor unit 110, 110-*a*, 110-*b*. In addition, at block 1035, the method 1000 may include initiating an adjustment of the lighting system based at least in part on the condition. For example, in one embodiment where a particular occupant has a lighting preference of a certain brightness level for a light, but the ambient light level is abnormally low or high, the initiated adjustment to the lighting system may be vary from the occupant's typical preferences. In addition, if an occupant typically leaves a home, or takes a certain route through a home, at a particular time of day, that condition may be detected and may light that same route at that time of day. Another embodiment may involve detecting that an occupant is carrying a set of car keys, and illuminating a path to a corresponding vehicle, or detecting a carried work laptop or briefcase and illuminating a path to study room or office. Moreover, initiating an adjustment may include weighing multiple conditions together, and may also include placing greater weight on certain conditions. For instance, in the case of the aforementioned condition examples involving a time of day and detecting an object, an occupant may start a path at an early morning hour towards a garage, to start a daily commute to work. However, it may be detected that the occupant is not carrying a set of car keys. Consequently, an adjustment may be initiated illuminating an area of the structure where the car keys may be found, and in a manner to attract the attention of the occupant.

Figure 11:
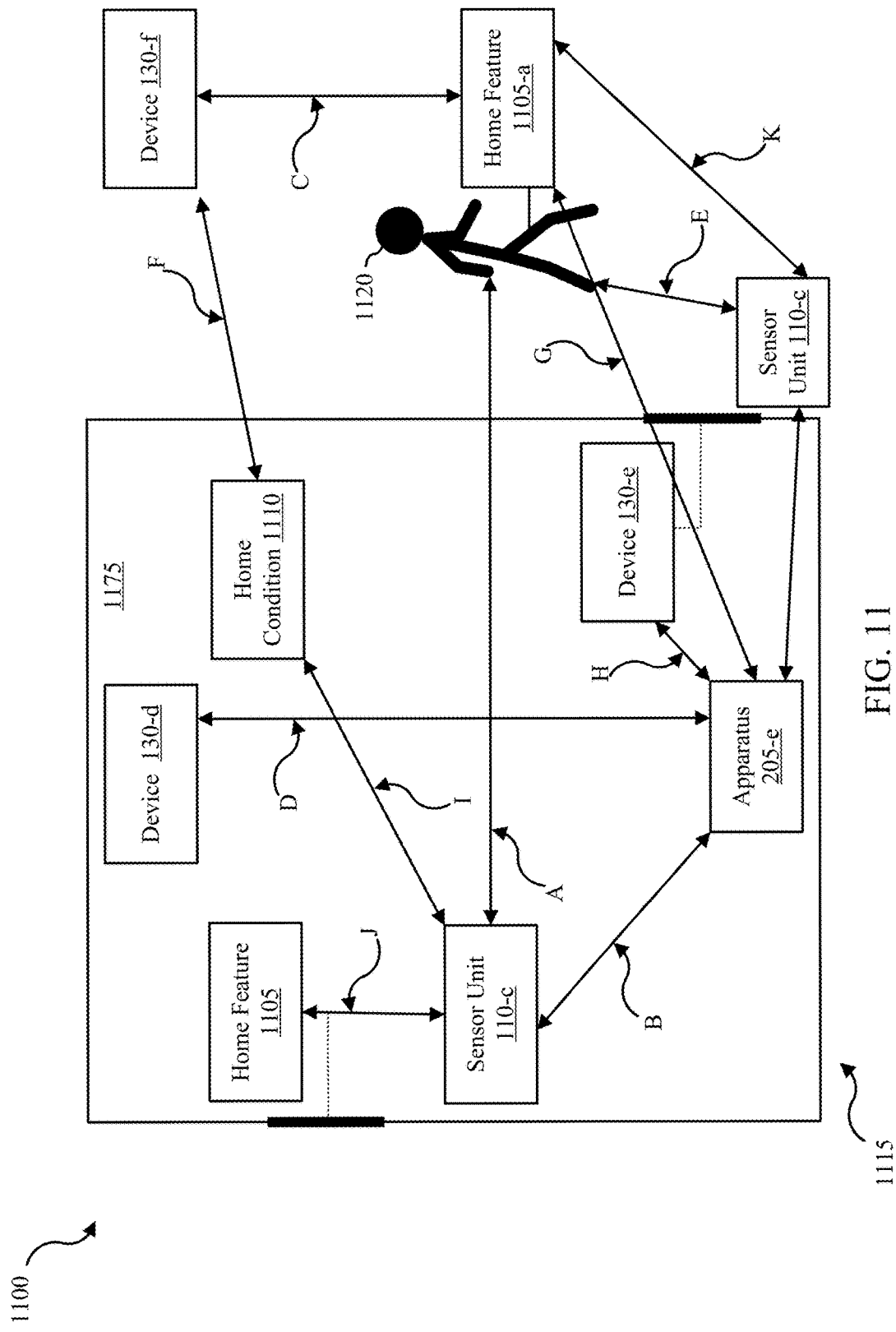
FIG. 11 shows one embodiment of a system relating to a security and/or an automation system, in accordance with various aspects of this disclosure.

FIG. 11 illustrates an example of a system 1100 in accordance with various aspects of the disclosure, in one environment, a home 1115. One or more embodiments of a system (e.g., system 1100) may include one or more sensors, such as sensor units 110-*c*. The sensor units 110-*c* may be examples of one or more aspects of the sensor units 110, 110-*a*, 110-*b* from FIGS. 1, 5 and 6, respectively.

In some embodiments the sensor units 110-*c* may gather data relating to an occupant 1120 of the home 1115. As mentioned above with reference to sensor units 110, 110-*a*, 110-*b*, sensor units 110-*c* may also monitor among other things home features 1105, 1105-*a*, which may include for example an appliance, water valve, computer, phone, television, entertainment system (or other electronic device), oven, thermostat, fireplace, door, lock, or a cupboard, etc. In addition, the sensor units 110-*c* may monitor among other things conditions 1110 relating to the home 1115, such as, for example, light level, time, the presence of a detected object or of a second occupant, an activity level of a second occupant, an ambient noise level, etc. In some embodiments, the sensor units 110-*c* may communicate with an apparatus 205-*e* (which apparatus 205-*e* may be an example of one or more aspects of one or more of the apparatuses 105, 205, 205-*a*, 205-*b*, 205-*c*, 205-*d* described above in FIGS. 1-6). Thus, data relating to an occupant 1120 may be received, in the described system embodiment 1100, by the apparatus 205-*e*. Thus, the aforementioned examples of data relating to home features 1105, 1105-*a* and home conditions 1110 may be received in the system embodiment 1100 by the apparatus 205-*e*, and accordingly, an adjustment of an environment may be initiated utilizing the device(s) 130-*a*. Thus, in one embodiment, the apparatus 205-*e* may be in communication with devices 130-*c*, 130-*d*, 130-*e*, 130-*f* (which devices 130-*c*, 130-*d*, 130-*e*, 130-*f* may be examples of one or more aspects of one or more of the devices 130, 130-*a*, 130-*b* mentioned above) for adjusting an environment, and in some embodiments, a lighting system.

At A and E, sensor units 110-*c* may capture data relating to an occupant 1120 of a home 1115. At B and F, the apparatus may receive the data relating to the occupant from the sensor units 110-*c*. The apparatus 205-*e* may analyze the data and the occupant may be identified based at least in part on the analyzing. This identification may be based on sensor units 110-*c* being positioned at one or more different heights, angles, viewpoints, detecting different wavelengths, signals (e.g., signals from a mobile device), geolocation, some combination, and/or other things. At D and H through devices 130-*d*, 130-*e*, an adjustment or adjustments of an environment (e.g., a lighting system) may be initiated based at least in part on the identifying.

In some examples, data gathered by the sensor units 110-*c* may not necessarily relate only to identifying the occupant 1120 and also may not necessarily relate to an occupant. For instance, through the sensor units 110-*c*, the location of the occupant 1120 may be tracked from room to room of a structure 1175 and also from inside to outside the structure 1175. Moreover, as shown at I and J, data gathered by the sensor units 110-*c* may include data relating to home conditions 1110 and/or home features 1105. In addition, as shown by E and K, such data may also relate to an occupant 1120 interacting with a home feature 1105-*a*.

Similarly, analysis of data may not necessarily relate to identifying the occupant 1120. For example, once an occupant 1120 is identified (and in some embodiments even before identifying the occupant 1120, but merely by tracking an occupant regarding of identity), analyzing the data may include correlating data with the identified occupant 1120, logging or recording the data, determining environment preferences and predicting behavior of the occupant 1120, among other things. Moreover, in some examples, analysis of the data need not be performed by the apparatus 205-*e*, and in some instances analyzed data may not necessarily be gathered by sensor units 110-*c*. By way of example and not limitation, as shown at C, in some instances a home feature 1105-*a* may communicate directly with a device 130-*c* to communicate that it is in use or some state of interaction with the occupant 1120, and an adjustment to an environment (such as a particular lighting setting) may be initiated through the device 130-*c* at least partly on that basis (with and/or without that data necessarily being gathered or sensed by sensor units 110-*c* or sent to the apparatus 205-*e* by the sensor units 110-*c*). For example, an occupant may attempt to open a locked door by inserting a key into the lock thereof, or may attempt to make a replacement to a pipe under a sink, or replace the head of a sprinkler at dusk, or sift through clothes on hangers in the corner of a walk-in closet, and these states of interaction may cause a light or lights to be adjusted for a particular areas and/or based on the one or more interactions with those particular features.

In some examples, aspects from two or more of the methods 700, 800. 900, 1000 may be combined and/or separated. It should be noted that the methods 700, 800, 900, 1000 are just example implementations, and that the operations of the methods 700-1000 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
    receiving data relating to an occupant of a home from a sensor;
    analyzing the data by matching the data with a particular occupant profile of a plurality of occupant profiles, wherein the particular occupant profile is stored prior to the analyzing and is based at least in part on user input provided by the particular occupant;
    identifying the occupant as a particular occupant corresponding to the particular occupant profile based at least in part on the analyzing; and
    initiating an adjustment of a lighting system based at least in part on the identifying the particular occupant and the particular occupant profile.

2. The method of claim 1, wherein identifying the occupant comprises:
    matching the occupant to a group of known occupants.

3. The method of claim 1, wherein the analyzing comprises:
    searching a catalog of the plurality of occupant profiles; and
    comparing the data with the catalog of occupant profiles;
    wherein initiating the adjustment is based at least in part on the catalog.

4. The method of claim 3, wherein initiating the adjustment is based at least in part on an occupant lighting preference of the particular occupant.

5. The method of claim 3, further comprising:
    correlating the data relating to the identified particular occupant with the particular occupant profile.

6. The method of claim 3, wherein identifying the occupant comprises:

creating a profile for the occupant based at least in part on searching the catalog of occupant profiles.

7. The method of claim 5, wherein the data comprises:
a past adjustment of the lighting system by the occupant; and
wherein initiating the adjustment of the lighting system is based at least in part on the past adjustment of the lighting system.

8. The method of claim 5, wherein the data comprises: motion of the occupant.

9. The method of claim 8, wherein initiating the adjustment is based at least in part on a predicted motion of the occupant derived at least in part from the data.

10. The method of claim 1, wherein the data comprises:
at least one of a height, or a weight, or a color, or a width, or a body shape, or an article of clothing, or footwear, or a carried item, or glasses, or a facial characteristic, or a mobile device, or a voice, or a gait, or a motion, or a combination thereof.

11. The method of claim 1, further comprising:
detecting a condition relating to the home,
wherein initiating the adjustment of the lighting system is further based at least in part on the condition.

12. The method of claim 11, wherein the condition comprises:
at least one of an ambient light level, or a time, or a detected object in the home, or a presence of a second occupant, or an activity level of a second occupant, or an ambient noise level, or a combination thereof.

13. The method of claim 1, wherein the data comprises: image data.

14. The method of claim 1, wherein initiating the adjustment of the lighting system is further based at least in part on the occupant interacting with a home feature.

15. The method of claim 14, wherein the home feature comprises:
at least one of an appliance, or a water valve, or an electronic device, or a fireplace, or a door, or a lock, or a cupboard, or a combination thereof.

16. The method of claim 1, wherein the lighting system comprises:
a first light in a first room and a second light in a second room; and
wherein initiating the adjustment comprises adjusting the first light and the second light.

17. An apparatus for security and/or automation and/or lighting systems, comprising:

a processor;
memory in electronic communication with the processor; and
instructions stored in the memory, the instructions being executable by the processor to:
receive data relating to an occupant of a home from a sensor;
analyze the data by matching the data with a particular occupant profile of a plurality of occupant profiles, wherein the particular occupant profile is stored prior to the analyzing and is based at least in part on user input provided by the particular occupant;
identify the occupant as a particular occupant corresponding to the particular occupant profile based at least in part on the analyzing; and
initiate an adjustment of a lighting system based at least in part on the identifying the particular occupant and the particular occupant profile.

18. The apparatus of claim 17, wherein the instructions are executable by the processor to analyze the data by:
searching a catalog of occupant profiles; and
comparing the data with the catalog of occupant profiles;
wherein initiating the adjustment is based at least in part on the occupant profiles.

19. A non-transitory computer-readable medium storing computer-executable code, the code executable by a processor to:
receive data relating to an occupant of a home from a sensor;
analyze the data by matching the data with a particular occupant profile of a plurality of occupant profiles, wherein the particular occupant profile is stored prior to the analyzing and is based at least in part on user input provided by the particular occupant;
identify the occupant as a particular occupant corresponding to the particular occupant profile based at least in part on the analyzing; and
initiate an adjustment of a lighting system based at least in part on the identifying the particular occupant and the particular occupant profile.

20. The non-transitory computer-readable medium of claim 19, wherein the code is further executable by the processor to initiate the adjustment based at least in part on an occupant lighting preference.

* * * * *